United States Patent
Sekita et al.

[11] Patent Number: 5,853,659
[45] Date of Patent: Dec. 29, 1998

[54] STEEL, STEEL SHEET HAVING EXCELLENT WORKABILITY AND METHOD OF PRODUCING THE SAME BY ELECTRIC FURNACE-VACUUM DEGASSING PROCESS

[75] Inventors: Takashi Sekita; Taro Yahiro; Saiji Matsuoka; Toshio Fujimura; Takemi Yamamoto; Masahiko Morita; Osamu Furukimi; Arata Ueda, all of Okayama, Japan

[73] Assignee: Kawasaki Steel Corporation, Japan

[21] Appl. No.: 806,765

[22] Filed: Feb. 26, 1997

[30] Foreign Application Priority Data

| Feb. 29, 1996 | [JP] | Japan | 8-043141 |
| Jul. 15, 1996 | [JP] | Japan | 8-184812 |
| Jul. 15, 1996 | [JP] | Japan | 8-184813 |

[51] Int. Cl.$^6$ .............. C21C 5/52; C21D 8/02; C22C 38/08; C22C 38/14
[52] U.S. Cl. ............ 420/92; 420/93; 75/10.64; 75/508; 148/541; 148/546
[58] Field of Search ................. 75/10.64, 508; 148/661, 603, 602, 541, 546, 320, 508; 420/126, 128, 89, 92, 93

[56] References Cited

U.S. PATENT DOCUMENTS 3,765,874  10/1973  Elias et al. .

FOREIGN PATENT DOCUMENTS

| 0 565 066 A1 | 10/1993 | European Pat. Off. . |
| 2-173213 A | 7/1990 | Japan . |
| 5-132740 A | 5/1993 | Japan . |
| 6-235047 A | 8/1994 | Japan . |
| 7-242938 A | 9/1995 | Japan . |

*Primary Examiner*—Deborah Yee
*Attorney, Agent, or Firm*—Austin R. Miller

[57] ABSTRACT

Steel having excellent workability and deep drawability is produced by an electric furnace-vacuum degassing process. The steel has a composition which comprises about:

C: 0.0050 wt % or less
Si: 1.5 wt % or less
Mn: 1.5 wt % or less
P: 0.10 wt % or less
Al: 0.10 wt % or less
S: 0.020 wt % or less
O: 0.01 wt % or less
Cu: 0.02–1.5 wt %
Ni: 0.02–2.0 wt %
Ti and/or Nb: from 0.001 to 0.10 wt %
N: from 0.0040 to 0.0090 wt %.

35 Claims, 2 Drawing Sheets

STEEL, STEEL SHEET HAVING EXCELLENT WORKABILITY AND METHOD OF PRODUCING THE SAME BY ELECTRIC FURNACE-VACUUM DEGASSING PROCESS

BACKGROUND OF THE INVENTION

1. Field of the Invention

The present invention relates to production of steel in an electric furnace, and more particularly relates to production of steel having excellent workability and deep-drawability even when the ferrous material processed in the electric furnace contains significant amounts of tramp elements such as Cu and Ni.

2. Description of the Related Art

Nowadays, electric furnaces are widely used all over the world, and contribute significantly to the production of steel products such as steel bars. Some types of steels produced by the electric furnace now find uses as hot-rolled steel sheets, cold-rolled steel sheets and surface-treated steel sheets.

However, the steel products of electric furnaces tend to contain tramp elements because the furnace process uses iron scrap as a feed material. Such tramp elements seriously impair the mechanical properties of the steel products, as well as the internal and surface qualities of the same. Such steel products, therefore, have not been usable in so-called high-grade steel sheets, typically automotive steel sheets. Thus, the steels produced by melting iron scrap now have only limited use, particularly in thin steel sheets; the blast furnace-converter process is still the only process which can provide steels that are effective as materials for high-grade steel sheets.

However, there is a worldwide demand for technology which would enable economic production of a variety of valuable types of steels, including high-grade steels.

The blast furnace-converter process requires a vast investment. Thus, any less expensive technique which would enable production of high-grade steels, by use of a compact facility such as an electric furnace, could produce highly advantageous benefits.

Various techniques for producing high-grade thin steel sheets have been proposed as in, for example, Japanese Examined Patent Publication Nos. 44-18066, 53-12889 and 3-56301. All these proposed techniques are intended to reduce the contents of C and N as much as possible, and do not accomplish or even consider removal of tramp elements such as Cu and Ni which are introduced by recycling of iron scrap.

Steels produced by recycling of iron scrap through an electric furnace have N contents as high as 0.004 wt % or greater. In addition, tramp elements such as Cu and Ni contained in iron scrap cannot be removed effectively in the course of refining, and accordingly remain in the steel.

Under these circumstances, therefore, production of hot-rolled, cold-rolled or surface-treated steel sheets, especially when high workability and good appearance are essential, has relied principally upon using molten pig iron, and uses expensive converter refining, vacuum degassing, hot-rolling and cold-rolling to diminish the N content as much as possible, while resisting as much as possible the inclusion of tramp elements.

Methods have been proposed for production of workable hot-rolled, cold-rolled and surface-treated steel sheets from electric furnace steels, which have large contents of tramp elements.

Japanese Unexamined Patent Publication No. 6-235047 discloses a method for producing a cold-rolled steel sheet which, despite a high N content, has good anti-aging characteristics and press workability. The resulting cold-rolled steel sheet, however, has a C content which is 0.005 wt % or greater and, hence, can achieve only a Lankford value (r value) as low as 1.60 to 1.78, particularly when the steel includes substantial amounts of tramp elements. This is exemplified by the cases of Samples Nos. D-2 and D-5 to be referred to hereinafter in accordance with said reference. Consequently, this steel sheet does not even have adequate deep-drawability.

Japanese Unexamined Patent Publication No. 4-371528 discloses a technique for producing a cold-rolled steel sheet suitable for deep drawing. This technique, however, deals with steels having abnormally low N contents of 0.0025 wt % or less, which is lower than that of ordinary steel materials treated in electric furnaces. In addition, the deep-drawability of the resulting steel is so limited that its r value is about 1.85 or less.

Japanese Unexamined Patent Publication No. 7-118795 proposes a technique for producing a cold-rolled steel sheet said to have good workability. This steel, however, has a high C content of 0.03 wt % or greater, and can achieve only a rather low r value of 1.83 or less, thus failing to provide adequate deep-drawability.

A method is disclosed in Japanese Unexamined Patent Publication No. 7-157840, for producing a hot-rolled steel sheet. However, the product has a C content of 0.01 wt % or greater and, hence, cannot provide good workability.

Although various methods and techniques have been proposed for producing hot-rolled, cold-rolled or surface-treated steel sheets from steels prepared by the electric furnace process and rich in tramp elements, all these proposals are still unsatisfactory. They simply cannot provide a sufficient level of workability.

SUMMARY OF THE INVENTION

Accordingly, it is an object of the present invention to turn the disadvantages of tramp metals into assets, and to create a steel product having excellent deep-drawability notwithstanding the presence of tramp elements such as Cu and Ni. Another object is to provide a steel product having excellent workability, i.e., about 1.85 or greater in terms of r value, from a steel material prepared by the electric furnace process and containing tramp elements. Another object is to provide a method for the production of such a steel.

Through intense studies and research, we have found that the influence of C and N on the r value, when the steel contains tramp elements such as Cu and Ni, is notably different from the influence experienced in the case of clean steel which is devoid of such tramp elements.

It is generally considered that C and N in the form of fine inclusions such as carbides and nitrites, e.g., titanium carbide and titanium nitride, affect the r value of the steel. However, we have found that the behavior of such inclusions on the formation of a {111} recrystallized texture is different from that in the conventional art. More specifically, we have discovered that, while the contents of titanium carbides are preferably reduced, there is advantage in maintaining the contents of titanium nitrites positively at critical levels, and that this achieves a surprising improvement.

It has been found also that a mild steel sheet can be created having an excellent deep drawability r value of about 2.3 or greater, when the contents of Cu and Ni are maintained within critically restricted ranges. It has been found also that a still further improvement in deep drawability, to an r value of about 2.5 or greater, is achievable when the ratio of Mn/S is controlled to about 7.0 or less in the presence of critically controlled amounts of Cu and Ni.

The present invention is based upon these discoveries. According to a particular embodiment there is provided a steel having excellent workability, produced by an electric furnace-vacuum degassing process, wherein the steel has a composition which contains about:

C: 0.0050 wt % or less
Si: 1.5 wt % or less
Mn: 1.5 wt % or less
P: 0.10 wt % or less
Al: 0.10 wt % or less
S: 0.020 wt % or less
O: 0.01 wt % or less
Cu: 1.5 wt % or less
Ni: 2.0 wt % or less
Ti and/or Nb: from 0.001 to 0.10 wt %
N: from 0.0040 to 0.0090 wt %.

According to another embodiment of the present invention, there is provided a mild steel having excellent workability, produced by an electric furnace-vacuum degassing process, the steel having a composition which contains about:

C: 0.0050 wt % or less
Si: 0.2 wt % or less
P: 0.10 wt % or less
Al: 0.10 wt % or less
O: 0.010 wt % or less
Mn: 0.5 wt % or less
S: 0.020 wt % or less
N: from 0.0040 to 0.0090 wt %
Ti: from 0.014 to 0.10 wt % wherein the contents of Ti, N, S and Mn meet the condition of about:

$$Ti/48-(N/14+S^*/32) \geq C/12$$

where
$$S^*=32(S/32-0.3Mn/55)$$
said composition further containing:
Cu: 0.96 wt % or less
Ni: 0.88 wt % or less,
wherein the contents of Cu and Ni meet the condition:

$$0.0015 \leq Cu/64+Ni/59 < 0.0150.$$

The present invention also provides a method of producing steel having excellent workability by conducting an electric furnace-vacuum degassing process, using as the main material iron scrap alone or iron scrap combined with molten pig iron. The method comprises:

adjusting the steel composition in an electric furnace so as to comprise about:
C: from 0.03 to 0.10 wt %
Cu: 1.5 wt % or less
Ni: 2.0 wt % or less
S: 0.020 wt % or less
N: from 0.0040 to 0.0150 wt %
discharging the molten steel at a temperature not lower than 1580° C. from the electric furnace;
degassing the molten steel in a vacuum degassing furnace, while adding alloy components so as to obtain a steel having a composition which contains about:

C: 0.0050 wt % or less
Si: 1.5 wt % or less
Mn: 1.5 wt % or less
P: 0.10 wt % or less
Al: 0.10 wt % or less
S: 0.020 wt % or less
O: 0.01 wt % or less
Cu: 1.5 wt % or less
Ni: 2.0 wt % or less
Ti and/or Nb: from 0.001 to 0.10 wt %, and
N: from 0.0040 to 0.0090 wt %.

According to a further embodiment of the present invention, steel having excellent workability is produced by an electric furnace-vacuum degassing process, using as the main material iron scrap alone or iron scrap with added molten iron. The method comprises:

adjusting the steel composition in an electric furnace so as to contain about:
C: from 0.03 to 0.10 wt %
Cu: 1.5 wt % or less
Ni: 2.0 wt % or less
S: 0.020 wt % or less
N: from 0.0040 to 0.0150 wt %
discharging the molten steel at a temperature not lower than about 1580° C. from the electric furnace;
degassing the molten steel in a vacuum degassing furnace, while adding alloy components so as to obtain a steel having a composition which contains about:

C: 0.0050 wt % or less
Si: 1.5 wt % or less
Mn: 1.5 wt % or less
P: 0.10 wt % or less
Al: 0.10 wt % or less
O: 0.010 wt % or less
Mn: 0.5 wt % or less
S: 0.020 wt % or less
N: from 0.0040 to 0.0090 wt %
Ti: from 0.014 to 0.10 wt %
Cu: 0.96 wt % or less
Ni: 0.88 wt % or less;
wherein the adjusted composition meets the conditions of about:

$$Ti/48-(N/14+S^*/32) \geq C/12$$

where
$$S^*=32(S/32-0.3Mn/55);$$

and $$0.0015 \leq Cu/64+Ni/59 \leq 0.0150;$$

continuously casting the molten steel of the adjusted composition so as to produce a slab;
heating the slab to a temperature of from about 900° to about 1300° C.;
subjecting the heated slab to hot rolling conducted at a total rolling reduction of about 70% or higher and rolling finish temperature of about 600° C. or higher;
taking up the hot-rolled steel at a temperature of about 800° C. or lower;
subjecting the hot-rolled steel to a cold rolling conducted at a rolling reduction of about 50% or higher; and subjecting the cold-rolled steel to an annealing conducted at a temperature of about 600° C. or higher for a period of about 5 seconds or longer.

These and other objects, features and advantages of the present invention will become clear from the following description of the embodiments, and from the appended claims.

DESCRIPTION OF THE PREFERRED EMBODIMENTS

The following description will commence by outlining the results of various experiments which are relevant to the present invention.

Sheet bars were prepared, having the composition of C: from 0.0010 to 0.0130 wt %, Si: 0.02 wt %, Mn: 0.03 wt %, P: 0.01 wt %, S: 0.010 wt %, Al: 0.03 wt %, N: 0.0020 to 0.0130 wt %, Ti: from 0.03 to 0.10 wt %, Cu: 0.8 wt %, Ni: 1.0 wt %, 0: from 0.0020 to 0.0050 wt %, and the balance substantially Fe. Each sheet bar was heated up to and soaked at 1050° C., hot-rolled at a finish temperature of 890° C., coiled at 600° C., preserved for 1 hour, cooled in the furnace, cold-rolled at a rolling reduction of 80% and then subjected to annealing for recrystallization conducted at 830° C. for 20 seconds.

Figure 1:
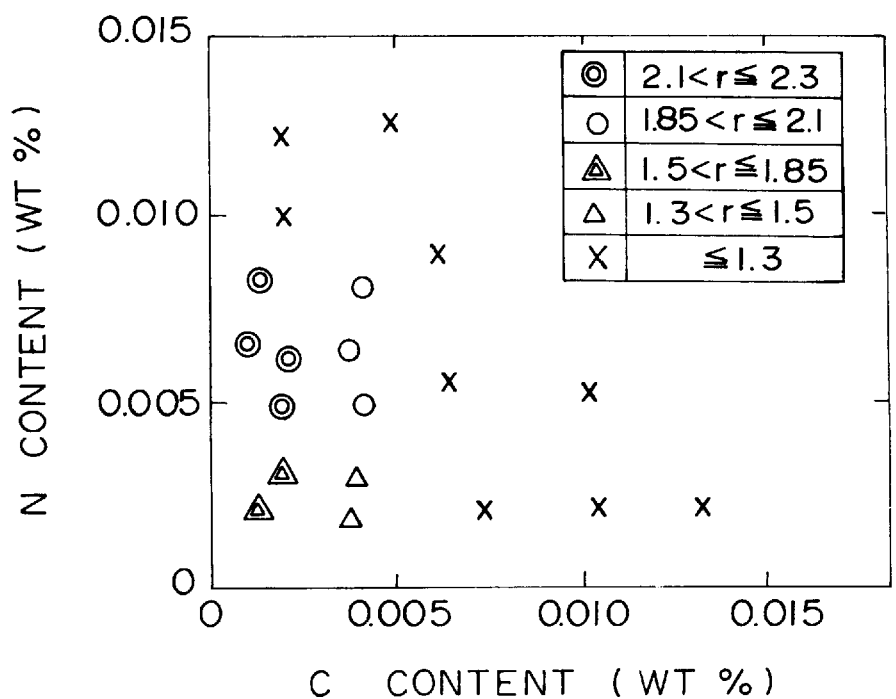
FIG. 1 is a graph showing the influence of individual variations of C and N contents on the r values of a steels.

An investigation was conducted to clarify how the r values of the thus-obtained cold-rolled steel sheets are affected by the C and N contents of the steels. The results are shown in FIG. 1.

The Lankford value (r value) was determined in accordance with the following formula as the average value measured by a three-point measuring method on each test piece to which a pre-tention of 15% had been given, and by a JIS-5 tensile tester.

$$r=(r_L+2r_D+r_C)/4$$

where, r: Lankford value (r value)

$r_L$: value measured in the rolling direction $r_C$: value measured in direction perpendicular to the rolling direction $r_D$: value measured in the direction 45° to the rolling direction As will be seen from FIG. 1, the r value of cold-rolled steel sheet depends considerably on the C and N contents. More specifically, high r values exceeding about 1.85 could be obtained when both the conditions of $C \leq 0.0050$ wt % and N: 0.0040 to 0.0090 wt % were simultaneously met.

The influence of C and N contents on the r value is considered to be attributable to formation of carbides and nitrides such as titanium carbide and titanium nitride.

We have now found that, when the steel contains significant amounts of tramp elements such as Cu and Ni, the behavior of such carbides and nitrides on the formation of {111} recrystallized texture of the cold-rolled steel sheet is different from its behavior with clean steel that is free of such tramp elements. More specifically, we have found that, while the contents of titanium carbides are preferably reduced, contents of titanium nitrites are beneficially maintained positively at certain levels, rather than being reduced, in order to form an advantageous {111} recrystallized texture.

This advantageous effect is remarkable particularly when both the conditions of $C \leq 0.0050$ wt % and N: 0.0040 to 0.0090 wt % are simultaneously approximately met.

Sheet bars were also prepared having compositions containing about C: 0.0025 wt %, Si: 0.02 wt %, Mn: 0.13 wt %, P: 0.01 wt %, S: 0.010 wt %, Al: 0.03 wt %, N: 0.0050 wt %, Ti: 0.05 wt %, Cu: 0 to 3 wt %; Ni: 0 to 3 wt %, O: 0.0020 to 0.0050 wt %, and the balance substantially Fe. Each sheet bar was heated up to and soaked at 1250° C., hot-rolled at a finish temperature of 890° C. and a total rolling reduction of 90%, preserved at 600° C. for 1 hour, cooled in the furnace, cold-rolled at a rolling reduction of about 80% and then subjected to annealing for recrystallization conducted at about 830° C. for 20 seconds.

An investigation was conducted to clarify how the r values of the thus-obtained cold-rolled steel sheets are affected by the Cu and Ni contents of the steels. The results are shown in FIG. 2.

Figure 2:
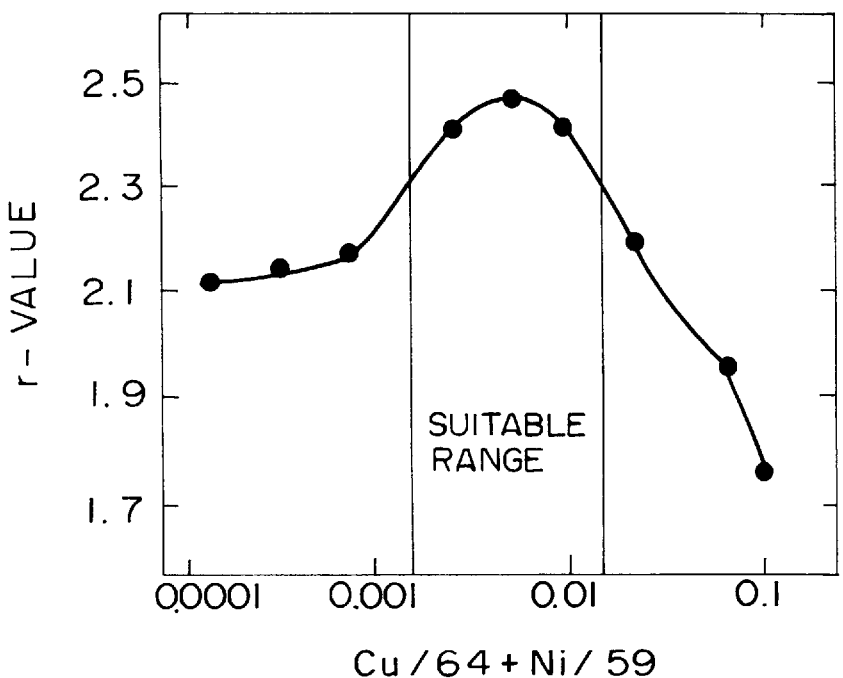
FIG. 2 is a graph showing the influence of various Cu plus Ni contents on the r values of a steels.

As will be seen from FIG. 2, the r value of the cold-rolled steel sheet showed a large dependency also on the contents of Cu and Ni. Specifically, high r values of about 2.3 or higher could be obtained by limiting these contents to meet the condition of about $0.0015 \leq Cu/64 + Ni/59 \leq 0.015$.

The improvement in r value accomplished as a result of restriction of the Cu and Ni contents to the above-specified range is attributable to grain refinement of the crystal grains of the steel sheet as hot-rolled. More specifically, in the steel having moderate levels of contents of tramp elements such as Cu and Ni, the crystal grains of the hot-rolled steel sheet are refined, so that the {111} recrystallized texture grows after annealing subsequent to cold rolling, thus achieving a high r value. However, too large Cu and Ni contents serve to reduce the r value, because the effect of grain refinement of the hot-rolled steel sheet is surpassed by the detrimental effect imposed by Cu and Ni in the form of solid solutions.

It has been confirmed that the effect of grain refinement produced as a result of presence of Cu and Ni is particularly remarkable when the C content is about 0.005 wt % or less and while the N content is from about 0.0040 to 0.0090 wt %.

Steel bars were also prepared having compositions containing about C: 0.0025 wt %, Si: 0.02 wt %, Mn: 0.02 to 0.30 wt %, P: 0.01 wt %, S: 0.008 to 0.016 wt %, Al: 0.03 wt %, N: 0.0050 wt %, Ti: 0.05 wt %, Cu: 0.2 wt %; Ni: 0.2 wt %, 0: 0.0020 to 0.0050 wt %, and the balance substantially Fe. Each sheet bar was heated up to and soaked at 1250° C., hot-rolled at a finish temperature of 890° C. and a total rolling reduction of 90%, preserved at 600° C. for 1 hour, cooled in the furnace, cold-rolled at a rolling reduction of 80% and then subjected to annealing for recrystallization conducted at about 830° C. for 20 seconds.

An investigation was conducted to clarify how the r values of the thus-obtained cold-rolled steel sheets are affected by the Mn and S contents of the steels. The results are shown in FIG. 3.

Figure 3:
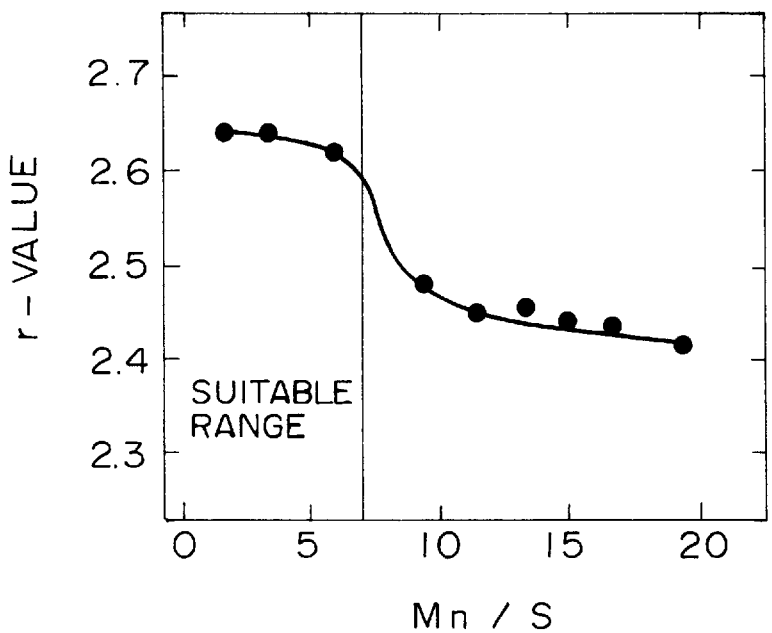
FIG. 3 is a graph showing the influence of the Mn/S ratio on the r values of steels.

As will be seen from FIG. 3, the r value of the cold-rolled steel sheet showed a significant dependency on the ratio Mn/S. Specifically, high r values of about 2.5 or higher could be obtained by limiting the value of the ratio Mn/S to meet the approximate condition of $Mn/S \leq 7.0$.

A further improvement of r value was accomplished as a result of restriction of the Mn/S ratio. It was attributable to precipitation of MnS or solid solution of Mn. More specifically, in the steel having moderate levels of contents of tramp elements such as Cu and Ni, precipitation of MnS, or a solid solution of Mn, strongly affects the formation of the recrystallized texture. Consequently, the {111} recrystallized texture grows after annealing conducted subsequent to cold rolling, when the condition of Mn/S≦7.0 is met, thus achieving a high r value.

It has been confirmed that the described advantageous effect is remarkable particularly when the C content is about 0.005 wt % or less while the N content is from about 0.0040 to 0.0090 wt %, with the Cu and Ni contents satisfying the condition of about 0.0015≦Cu/64+Ni/59≦0.015.

Based on these facts discovered by the inventors, the present invention provides a steel having excellent workability even though produced by an electric furnace-vacuum degassing process, and even with the presence of tramp metals. The steel has a composition which contains about:
C: 0.0050 wt % or less
Si: 1.5 wt % or less
Mn: 1.5 wt % or less
P: 0.10 wt % or less
Al: 0.10 wt % or less
S: 0.020 wt % or less
O: 0.01 wt % or less
Cu: 1.5 wt % or less
Ni: 2.0 wt % or less
Ti and/or Nb: from 0.001 to 0.10 wt %
N: from 0.0040 to 0.0090 wt %.

The steel in accordance with the present invention may have a further restricted composition or contain additional elements, as in the following modifications.

A steel sheet which excels in workability can be obtained by further restricting the steel composition to about as follows.
Si: 0.5 wt % or less
Mn: 0.5 wt % or less
P: 0.06 wt % or less.

Mild steel sheet having excellent workability can be obtained by further restricting the steel composition about as follows:
Si: 0.2 wt % or less
Mn: 0.2 wt % or less.

A high-strength steel sheet having excellent workability can be obtained by restricting the steel composition about as follows:
Si: 1.0 wt % or less
Mn: from 0.10 to 0.6 wt %
P: from 0.02 to 0.10 wt %.

The C content of the steel composition may be restricted as about follows.
C: 0.0028 wt % or less.

The B content of the steel composition may be restricted about as follows.
B: from 0.0001 to 0.010 wt %.

The Mn content of the steel composition may be restricted about as follows.
Mn: 0.05 wt % or less.

A further embodiment of the steel in accordance with the present invention is a mild steel having excellent workability, produced by an electric furnace-vacuum degassing process, the steel having a composition which contains about:
C: 0.0050 wt % or less
Si: 0.2 wt % or less
P: 0.10 wt % or less
Al: 0.10 wt % or less
O: 0.010 wt % or less
Mn: 0.5 wt % or less
S: 0.020 wt % or less
N: from 0.0040 to 0.0090 wt %
Ti: from 0.014 to 0.10 wt %
wherein the contents of Ti, N, S and Mn meet the condition of about:

$$Ti/48-(N/14+S^*/32) \geq C/12$$

where
$$S^* = 32(S/32 - 0.3Mn/55)$$
said composition further containing about:
Cu: 0.96 wt % or less
Ni: 0.88 wt % or less,
wherein the contents of Cu and Ni approximately meet the condition of:

$$0.0015 \leq Cu/64+Ni/59 \leq 0.0150.$$

The steel composition of another form of steel may be further restricted or may contain additional elements, as in the following modifications.

The steel component may be further restricted about as follows:
Mn: 0.14 wt % or less, and
Mn/S≦7.0.

The steel composition may contain one or both members selected from the group consisting of:
Nb: from about 0.001 to 0.10 wt %; and
B: from about 0.0001 to 0.010 wt %.

The C content of the steel composition may be further restricted about as follows:
C: 0.0028 wt % or less The Mn content of the steel composition may be restricted about as follows.
Mn:
Mn: 0.05 wt % or less.

The invention also provides a method of producing steel having excellent workability by an electric furnace-vacuum degassing process, using as a main material iron scrap alone or iron scrap with addition of molten iron, the method comprising:
adjusting the steel composition in an electric furnace so as to contain about:
C: from 0.03 to 0.10 wt %
Cu: 1.5 wt % or less
Ni: 2.0 wt % or less
S: 0.020 wt % or less
N: from 0.0040 to 0.0150 wt %
discharging the molten steel at a temperature not lower than about 1580° C. from the electric furnace;
degassing the molten steel in a vacuum degassing furnace, while adding alloy components so as to obtain a steel having a composition which contains about:
C: 0.0050 wt % or less
Si: 1.5 wt % or less
Mn: 1.5 wt % or less
P: 0.10 wt % or less Al: 0.10 wt % or less
S: 0.020 wt % or less
O: 0.01 wt % or less
Cu: 1.5 wt % or less
Ni: 2.0 wt % or less
Ti and/or Nb: from 0.001 to 0.10 wt %
N: from 0.0040 to 0.0090 wt %.

One form of the steel production method of the invention may be modified as follows.

The composition of the steel in the electric furnace is adjusted to contain about:
C: from 0.03 to 0.10 wt %
Cu: 1.5 wt % or less
Ni: 2.0 wt % or less
N: from 0.0040 to 0.0150 wt %
and the method further comprises:
effecting ladle refining of the molten steel discharged from the electric furnace,so as to adjust the S content in the molten steel to about:
S: 0.020 wt %;
before the molten steel is subjected to vacuum degassing.

The step of degassing the molten steel while adding alloy components performed in the vacuum-degassing furnace is conducted in regard to Si, Mn and P such as to adjust the composition to contain about:
Si: 0.5 wt % or less
Mn: 0.5 wt % or less
P: 0.06 wt % or less; and
the method comprises the steps of:
continuously casting the molten steel of the adjusted composition so as to obtain a slab;
heating the slab to a temperature of from about 900° to 1300° C.;
subjecting the heated slab to hot rolling conducted at a total rolling reduction of about 70% or higher and rolling finish temperature of about 600° C. or higher; and
coiling the hot-rolled steel at a temperature of about 800° C. or lower.

The step of degassing the molten steel while adding alloy components performed in the vacuum-degassing furnace is conducted in regard to Si and Mn such as to adjust the composition to contain about:
Si: 0.2 wt % or less
Mn: 0.2 wt % or less; and
the method comprises the steps of:
continuously casting the molten steel of the adjusted composition so as to obtain a slab;
heating the slab to a temperature of from about 900° to 1300° C.;
subjecting the heated slab to a hot rolling conducted at a total rolling reduction of about 70% or higher and rolling finish temperature of about 600° C. or higher;
taking up the hot-rolled steel at a temperature of about 800° C. or lower;
subjecting the hot-rolled steel to a cold rolling conducted at a rolling reduction of about 50% or higher; and
subjecting the cold-rolled steel to annealing conducted at a temperature of about 600° C. or higher for a period of about 5 seconds or longer.

The step of degassing the molten steel while adding alloy components performed in the vacuum-degassing furnace is conducted in regard to Si, Mn and P such as to adjust the composition to contain about:
Si: 1.0 wt % or less
Mn: from 0.10 to 0.60 wt %
P: from 0.02 to 0.10 wt %; and
the method comprises the steps of:
continuously casting the molten steel of the adjusted composition so as to obtain a slab;
heating the slab to a temperature of from about 900° to 1300° C.;
subjecting the heated slab to a hot rolling conducted at a total rolling reduction of about 70% or higher and rolling finish temperature of about 600° C. or higher;
taking up the hot-rolled steel at a temperature of about 800° C. or lower;
subjecting the hot-rolled steel to a cold rolling conducted at a rolling reduction of about 50% or higher; and
subjecting the cold-rolled steel to annealing conducted at a temperature of about 600° C. or higher for a period of 5 seconds or longer.

A second form of the method of the invention for producing steel having excellent workability by an electric furnace-vacuum degassing process, using as the main material iron scrap alone or iron scrap with addition of molten iron, comprises the following steps:
adjusting the steel composition in an electric furnace so as to contain about:
C: from 0.03 to 0.10 wt %
Cu: 1.5 wt % or less
Ni: 2.0 wt % or less
S: 0.020 wt % or less
N: from 0.0040 to 0.0150 wt %
discharging the molten steel at a temperature not lower than about 1580° C. from the electric furnace;
degassing the molten steel in a vacuum degassing furnace, while adding alloy components so as to obtain a steel having a composition which contains about:
C: 0.0050 wt % or less
Si: 1.5 wt % or less
Mn: 1.5 wt % or less
P: 0.10 wt % or less
Al: 0.10 wt % or less
O: 0.010 wt % or less
Mn: 0.5 wt % or less
S: 0.020 wt % or less
N: from 0.0040 to 0.0090 wt %
Ti: from 0.014 to 0.10 wt %
Cu: 0.96 wt % or less
Ni: 0.88 wt % or less;
wherein the adjusted composition meets the conditions of about:

$$Ti/48-(N/14+S*/32) \geq C/12$$

where $$S* = 32(S/32 - 0.3Mn/55);$$

and $$0.0015 \leq Cu/64 + Ni/59 \leq 0.0150;$$

continuously casting the molten steel of the adjusted composition so as to obtain a slab;
heating the slab to a temperature of from about 900° to 1300° C.;
subjecting the heated slab to a hot rolling conducted at a total rolling reduction of about 70% or higher and rolling finish temperature of about 600° C. or higher;

taking up the hot-rolled steel at a temperature of about 800° C. or lower;

subjecting the hot-rolled steel to a cold rolling conducted at a rolling reduction of about 50% or higher; and subjecting the cold-rolled steel to an annealing conducted at a temperature of about 600° C. or higher for a period of 5 seconds or longer.

The second form of the method of the present invention may be modified as follows.

The step of degassing while adding alloy components performed in the vacuum-degassing furnace is conducted such that the adjusted composition contains about:

Mn: 0.14 wt % or less, and such that the following condition is met:

Mn/S≦about 7.0.

The step of degassing while adding alloy components performed in the vacuum-degassing furnace is conducted such that the adjusted composition contains one or both elements selected from the group consisting of:

Nb: from about 0.001 to 0.10 wt %; and

B: from about 0.0001 to 0.010 wt %.

The temperature to which the slab is heated ranges from about 900° to 1150° C.

Although not specifically mentioned in the foregoing description, it is to be understood that either of the disclosed forms of the steel of the invention can be produced by either of the forms of the method of the present invention.

We will now indicate reasons for restriction of the contents of components of the steel composition in accordance with the present invention.

C: about 0.0050 wt % or less

The steel in accordance with the present invention essentially contains C as an important element. As explained before in connection with FIG. 1, it is necessary that the C content is about 0.0050 wt % or less, in order to obtain a high r value exceeding about 1.85. Preferably, the C content is about 0.0028 wt % or less so that a further improvement in deep drawability, exceeding about 2.1 in terms of the r value, can be achieved.

In order that a high r value of about 2.3 or higher is achieved in the presence of later-mentioned adequate amounts of Cu and Ni, it is necessary that the C content is about 0.0050 wt % or less. A C content of about 0.0050 wt % or less is also an essential requirement for achieving a further increase of r value to about 2.5 or greater in the presence of later-mentioned adequate amounts of Cu and Ni and under the Mn/S ratio falling within the specified range.

Reduction of the C content down below about 0.0003 wt % leads to increased steelmaking costs, without giving any further appreciable improvement. For these reasons, the C content preferably ranges from about 0.0003 to 0.005 wt %.

Si: about 1.5 wt % or less

Si serves to strengthen the steel and is added by an amount determined in accordance with the level of the strength to be achieved. Inclusion of Si in excess of about 1.5 wt %, however, impairs the workability, so that the Si content is limited to about 1.5 wt % or less. More specifically, the Si content in steel sheets for working such as hot-rolled steel sheets is preferably about 0.5 wt % or less. The Si content in mild steel sheet with high workability is preferably about 0.2 wt % or less. The Si content for high-strength steel sheet for working is preferably about 1.0 wt % or less.

Reduction of the Si content leads to increased production costs without giving any further appreciable effect. The Si content, therefore, is limited to range from about 0.001 to 1.5 wt %.

Mn: about 1.5 wt % or less

Mn serves to strengthen the steel, as in the case of Si, and is added in accordance with the level of strength to be achieved. The Mn content is limited to 1.5 wt % or less, since inclusion of Mn in excess of this amount impairs the workability of the steel. The Mn content is preferably about 0.5 wt % or less in the case of steel sheets for working such as hot-rolled steel sheets and cold-rolled steel sheets. The Mn content in highly workable mild steel sheet is preferably about 0.2 wt % or less, and is preferably from about 0.10 to 0.60 wt % in high-strength steel sheets for working. In the case of the highly workable mild steel sheets, the Mn content may be about 0.5 wt % or less in the presence of suitable amounts of Cu and Ni, and may be about 0.14 wt % or less in the presence of suitable amounts of Cu and Ni under the Mn/S ratio falling within the specified range.

Conventionally, addition of Mn has been intended to prevent red shortness or embrittlement attributable to presence of S. According to the present invention, Mn is added for strengthening the steel, because the S component in the steel is precipitated and fixed in the form of TiS. Therefore, it is advantageous to reduce the Mn content to about 0.05 wt % or less, when preference is given to improvement of workability rather than improvement of strength.

Reduction of the Mn content down below about 0.001 wt % leads to increased production costs without giving any further appreciable effect. The Mn content therefore is limited to range from about 0.001 to 1.5 wt %.

P: about 0.10 wt % or less

Steel strengthening is also achieved by addition of P. This element is therefore added in accordance with the level of the strength to be achieved. Inclusion of P in excess of about 0.10 wt %, however, impairs workability and enhances brittleness. The P content therefore is limited to about 0.10 wt % or less. In case of steel sheets for working such as hot-rolled steel sheets, the P content is preferably about 0.06 wt % or less. For highly workable mild steel sheets, the P content is preferably about 0.10 wt % or less and, for high-strength steel sheets for working, the P content preferably ranges from about 0.02 to 0.10 wt %.

Reduction of the P content down below about 0.001 wt % only raises production costs without further appreciable effect. The P content, therefore, is preferably selected to fall within the range of from about 0.001 to 0.10 wt %.

S: 0.020 wt % or less

An increase of S containing in the steel tends to cause red shortness and a consequent cracking. Conventionally, such red shortness has been avoided by positively promoting formation of MnS as described before. According to the present invention, however, most of the S in the steel is precipitated and fixed in the form of TiS. Nevertheless, containing too much amount S should be avoided. Preferably, the S content does not exceed about 0.020 wt %.

On the other hand, reduction of S content down below about 0.0001 wt % merely raises production costs, without giving further appreciable effect. In the present invention, therefore, the S content is limited to range from about 0.0001 to 0.02 wt %. As explained before in connection with FIG. 3 of the drawings, further improved deep drawability, about 2.5 or higher in terms of the r value, is obtainable when the Mn to S ratio Mn/S is set to be about 7.0 or smaller. According to the invention, therefore, the Mn and S contents are determined such that the Mn/S ratio is about 7.0 or smaller.

Al: about 0.10 wt % or less

Al contributes not only to deoxidation but also to improvement of yield of carbide/nitride formers. The effect of inclusion of Al, however, is saturated when the Al content is increased beyond about 0.10 wt %. Rather, such an increase in the Al content impairs the workability of the steel. Reduction of the Al content down below about 0.001 wt % leads to increased production costs without further appreciable effect. According to the present invention, therefore, the Al content preferably falls within the range of from about 0.001 to 0.10 wt %.

O: about 0.01 wt % or less

The lesser the O content, the greater the workability. An O content not greater than about 0.01 wt %, however, does not cause substantial detrimental effect. The O content, therefore, is limited to about 0.01 wt % or less.

N: from about 0.0040 to 0.0090 wt %

N is an element of a particular importance in the present invention. It is critical that N is present in an amount ranging from about 0.0040 to 0.0090 wt %. This is because, as stated before, the influence of N on the r value in the presence of tramp elements such as Cu and Ni has been discovered to be different from that in clean steels free of such tramp elements. Specifically, presence of an adequate amount of titanium nitride is essential for enabling efficient formation of {111} recrystallized texture. For this reason, the N content in the steel of the present invention falls within the above-mentioned range which is considerably high as compared with conventional steels intended for working.

Ti and/or Nb: from about 0.001 to 0.10 wt %

Both Ti and Nb are important elements of the steel in accordance with the present invention. These elements effectively serve to decrease C and N in the form of solid solution by precipitating and fixing them in the form or carbides or nitrides, thus suppressing reduction in workability due to the presence of solid solute C and N. In addition, a suitable amount of nitride remaining in the steel contributes to improvement of the r value. The effect of addition of these elements, individually or in combination, is not appreciable when the content is below about 0.001 wt %, nor is further improvement achieved by the addition of these elements in excess of about 0.10 wt %. Rather, inclusion of these elements in excess of about 0.10 wt % causes reduction of workability. For these reasons, according to the present invention, the contents or content of Ti and/or Nb preferably ranges from about 0.001 to 0.10 wt %.

Ti in combination with N and S in the steel causes precipitation of titanium nitride and titanium sulfide which in turn effectively promotes formation of the {111} recrystallized texture of the steel, which is a factor for improving its deep drawability. To make this effect appreciable, the Ti content preferably meets about the following condition:

$$Ti/48 - (N/14 + S^*/32) \geq C/12$$

where $$S^* = 32(S/32 - 0.3Mn/55)$$

In order to achieve a high r value of about 2.3 or higher in the presence of suitable amounts of Cu and Ni, it is necessary that the conditions of the formulae shown above are satisfied. In such a case, the effect of addition of Ti is not appreciable when the Ti content is less than about 0.014 wt %. Containing Ti in excess of about 0.10 wt % only causes saturation of the effect but impairs deep drawability. For these reasons, in the steel of the present invention, the Ti content ranges preferably from about 0.014 to 0.10 wt %.

$S^*$ is assumed to be zero (0) when (S/32–0.3 Mn/55) is less than zero (0).

Cu: about 1.5 wt % or less

Hitherto, Cu has been considered as being an element which should be avoided, from the viewpoint of workability. As described before, however, it has been discovered that the undesirable effect of Cu can be suppressed when its content is about 1.5 wt % or less but instead affirmatively contributes to refining of the crystal grains of hot-rolled steel sheets, provided that the contents of C and N in the steel are suitably controlled. According to the invention, therefore, the Cu content is determined to be about 1.5 wt % or less.

Furthermore, further improvement of workability, in particular deep drawability of about 2.3 or higher in terms of the r value, is obtainable when the Cu content is decreased to about 0.96 wt % or less, provided that the contents of C and N are suitably controlled. In addition, Cu also contributes to refining of crystal grains of the hot-rolled steel sheets. In the highly workable mild steel of the present invention having an r value of about 2.3 or higher, therefore, the Cu content is limited to about 0.96 wt % or less.

In ordinary recycling of iron scrap using an electric furnace, the product steel incidentally contains at least about 0.02 wt % of Cu.

Ni: about 2.0 wt % or less

When the Ni content is about 2.0 wt % or less, the undesirable effect of Ni on workability is suppressed provided that the C and N contents are suitably controlled in accordance with the invention,as stated before. Rather, presence of Ni in an amount not greater than about 2.0 wt % effectively promotes refining of the crystal grains of hot-rolled steel sheet. According to the present invention, therefore, the Ni content is limited to about 2.0 wt % or less.

A steel sheet which excels in workability, in particular deep drawability, having an r value of about 2.3 or higher, is obtainable when Ni content is limited to be about 0.88 wt % or less, under suitable control of C and N contents in accordance with the invention. Ni also serves to promote refining of crystal grains of hot-rolled steel sheets. In the highly workable mild steel of the present invention having an r value of about 2.3 or higher, therefore, the Ni content is limited to about 0.88 wt % or less.

In ordinary recycling of iron scrap using an electric furnace, the product steel incidentally contains at least about 0.02 wt % of Ni.

$$0.0015 \leq Cu/64 + Ni/59 \leq 0.0150 \text{ approximately.}$$

As stated before, inclusion of suitable amounts of Cu and Ni contributes to refining of crystal grains of hot-rolled steel sheets. In order that this effect is obtained in a steel sheets for working having high r value of about 2.3 or higher, it is necessary that the contents of Cu and Ni in terms of (Cu/64+Ni/59) is about 0.0015 or greater. Presence of Cu and Ni in excess of about 0.0150, however, produces an undesirable effect caused by Cu and Ni in the form of solid solutions. For these reasons, the Cu content and Ni content are determined to meet the condition of about $0.0015 \leq Cu/64 + Ni/59 \leq 0.0150$. By selecting the Cu and Ni contents to meet this requirement, it is possible to obtain a steel sheet having an r value which is about 2.3 or higher.

In such steel sheets having high r value of about 2.3 or higher, the contents of Nb and B are determined as follows.

Nb: from about 0.001 to 0.10 wt %

Nb is a carbide former and contributes also to refining of crystal grains of hot-rolled steel sheets. These effects, however, are not notable when the Nb content is below about 0.001 wt %. On the other hand, increase of the Nb content beyond about 0.10 wt % impairs deep drawability, without producing any further appreciable effect. The Nb content, therefore, is limited to be from about 0.001 to 0.10 wt %.

B: from about 0.0001 to 0.010 wt %

B is an element which contributes to improvement in resistance to secondary working embrittlement. This effect, however, is not notable when the B content is about 0.0001 wt % or less, whereas, when B content exceeds about 0.010 wt %, deep drawability is impaired. If B is added, therefore, its content should range from about 0.0001 to 0.010 wt %.

The advantages of the present invention can be enjoyed particularly when the following elements are contained by amounts specified below:

Cr≦about 1.0 wt %, Mo≦about 0.5 wt %

Cr and Mo, as are the cases of Cu and Ni, do not adversely affect the workability of the steel but, rather, effectively contribute to refining of crystal grains of hot-rolled steel sheets, provided that their contents meet the conditions specified above.

In general, the limits of contents of inevitable inclusions of Cr and Mo are respectively about 0.02 wt % and about 0.005 wt %, respectively.

Sb≦about 0.01 wt %, Sn≦about 0.1 wt %, V≦about 0.01 wt %, Zn≦about 0.01 wt %, Co≦about 0.1 wt %

Sb, Sn, V and Zn do not produce undesirable effects on steel workability but, rather, contribute to improvement of appearance of surfaces of the hot-rolled steel sheets and cold-rolled steel sheets, provided that their contents satisfy the conditions shown above. The reason why such a contribution is made is not clear, but is presumed to be attributable to enrichment of the surface with these trace elements during coiling after hot rolling. In order to obtain an appreciable effect, the contents of these elements preferably fall within the following ranges, respectively.

Sb: from about 0.0005 to 0.01 wt %, Sn: from about 0.001 to 0.1 wt %, V: from about 0.0001 to 0.01 wt %, Zn: from about 0.0005 to 0.01 wt %, Co: from about 0.0005 to 0.1 wt %

Turning now to the method in accordance with the present invention, steels suitable for working are produced by electric furnace-vacuum degassing process. The composition and the temperature of the steel when discharged from the electric furnace are as follows:

C: from about 0.03 to 0.10 wt %

Any C content below about 0.03 wt % at the time of discharge from the electric furnace not only causes undesirable effect from the view point of economy, e.g., reduction in the yield, but also makes it difficult, due to enhanced nitrogen absorption by the molten steel, to achieve the condition of N≦about 0.0090 wt % which is required to be attained in the subsequent vacuum degassing step. On the other hand, presence of a large quantity of C in excess of about 0.10 wt % makes it difficult to decarburize the steel to the required level in the subsequent vacuum degassing step.

Cu: about 1.5 wt % or less, Ni: about 2.0 wt % or less

These elements are derived from iron scrap used as the iron source. Presence of excessive amounts of these elements makes it impossible to achieve the advantageous effect of the invention, even if the C and N contents of the steel are adequately controlled. The contents of Cu and Ni, therefore, are restricted to the ranges specified above.

Cu and Ni, once they are included, can hardly be removed. It is therefore necessary to control the quality and compounding of the iron scrap to be used, in order to maintain the Cu and Ni contents within the above-specified ranges.

S: about 0.020 wt % or less

It is also difficult to reduce the S content in a subsequent vacuum degassing step. It is therefore necessary that the S content is lowered to about 0.020 wt % or less at the time of discharge from the electric furnace. If it is not easy to desulfurize the steel in the electric furnace, it is advisable to conduct a refining treatment by using a ladle, so as to desulfurize the steel to the required level.

N: about 0.0040 to 0.0150 wt %

The content of N can be reduced in a subsequent vacuum degassing step. However, considering that absorption of N is unavoidable, it is desirable that the N content is lowered to required level in the course of the melting in the electric furnace. From this point of view, the N content of the steel when discharged from the electric furnace is restricted to range from about 0.0040 to 0.0150 wt %.

If the above-specified composition of the molten steel when discharged from the electric furnace is attainable by using iron scrap alone as the iron source, it is not necessary to add molten pig iron. However, if the composition of the molten steel specified above can hardly be obtained by the use of iron scrap alone, it is possible to use pig iron together with the iron scrap. The term "pig iron" is used here to mean not only molten iron obtained through a blast furnace process and iron cooled and solidified from such molten iron but also pig iron in the molten state or solidified state as obtained through a process such as the known COREX process, or DIOS process or the like, as well as the HBI (Hot Briquette Iron) technique.

When such pig iron is used, the ratio of the content of such pig iron to the total material should be limited so as not to exceed about 80 wt %, for otherwise a large quantity of oxygen is required to remove carbon inherent in the pig iron by decarburization. Such decarburization requires impractically long time and, hence, is uneconomical. In addition, "boiling" phenomenon tends to take place during the decarburization. Steel melt temperature at discharge: about 1580° C. or higher.

When the temperature of the molten steel at the time of discharge from the electric furnace is below about 1580° C., the temperature of the molten steel in the ladle is too low. Consequently, a very long time is required for secondary refining or, in the worst case, secondary refining cannot be performed at all. For these reasons, according to the present invention, the temperature of the molten steel at the time of discharge from the electric furnace is limited to about 1580° C. or higher.

However, when the process includes desulfurization in the ladle, the molten steel temperature at the time of discharge from the electric furnace may be about 1550° C. or higher, because in such a case it is possible to heat the molten steel while it is in the ladle. Namely, the molten steel received in the ladle may be heated up to a temperature which is required for the desulfurization and the subsequent vacuum degassing.

A description will now be given of the vacuum degassing operation. In this operation, alloy components are added to the molten steel received from the electric furnace, while the molten steel is being degassed under a vacuum. More specifically, the addition of the alloy components is conducted so as to obtain the following steel composition wherein the C, N and O contents are lowered to about the levels shown below:

C: 0.0050 wt % or less

N: from 0.0040 to 0.0090 wt %

O: 0.01 wt % or less

At the same time, about the following ranges of contents are obtained as a result of addition of the alloy components.

Si: 1.5 wt % or less

Mn: 1.5 wt % or less

Ti and/or Nb: from 0.001 to 0.10 wt %

P: 0.10 wt % or less

Al: 0.10 wt % or less

S: 0.020 wt % or less

Cu: 1.5 wt % or less

Ni: 2.0 wt % or less

In addition, when B is added, its content is controlled as follows to about

B: 0.0100 wt % or less

Vacuum degassing can generally be performed in accordance with the RH method or DH method. It is possible simultaneously to perform oxygen blowing. Oxygen blowing is preferably performed by means of a top blowing lance. This type of oxygen blowing advantageously promotes decarburization but also elevates the molten steel temperature. Obviously, however, oxygen blowing through the wall of the degassing furnace may be employed in addition to or instead of the oxygen blowing which employs a top blowing lance.

The final steel composition varies according to the type of the workable steel to be obtained. According to the invention, the steel composition is controlled to that of the final product in the course of vacuum degassing.

The molten steel thus adjusted to the desired composition is then subjected to the following steps to form it into thin steel sheets:

Casting step:

Although no particular restriction is posed in regard to the casting method, it is preferred to employ continuous casting from the viewpoint of production efficiency.

Slab heating step:

In the method of the present invention, it is important that C and N existing in the form of solid solutes are precipitated and fixed in the form of carbides and nitrides. It is also important and effective that the S component of the steel is precipitated and fixed in the form of TiS, because fixing of S contributes not only to improvement in resistance to red shortness but also to improvement in workability. In order that the carbides, nitrides and TiS are efficiently formed, it is preferred that the slab heating temperature is low. More specifically, the advantages of the present invention can effectively be obtained when the slab heating temperature is about 1300° C. or lower. For achieving a further improvement in the workability, the slab heating temperature is preferably about 1150° C. or lower. This is because a high El property can hardly be obtained when the slab heating temperature is higher than about 1150° C., partly because the coarsening of the precipitates is hampered so as to allow tramp elements such as Cu and Ni to impede growth of crystal grains during cold-rolling and annealing.

Sheet bars were prepared to have compositions containing about: C: 0.0025 wt %, Si: 0.02 wt %, Mn: 0.13 wt %, P: 0.01 wt %, S: 0.010 wt %, Al: 0.03 wt %, N: 0.0050 wt %, Ti: 0.05 wt %, Cu: 0.3 wt %, Ni: 0.2 wt %, Cu/64+Ni/59= 0.0081, 0: 0.0020 to 0.0050 wt %, and the balance substantially Fe. The sheet bars were heated to and soaked at temperatures between about 950° and 1250° C., hot rolled at finishing temperature of about 890° C. and at a total rolling reduction of about 90%, coiled at about 600° C., and shelved (air-cooled) for about 1 hour. Each hot-rolled steel sheet has then subjected to a cold rolling conducted at a rolling reduction of about 80%, followed by a recrystallizing annealing executed at about 830° C. for about 20 seconds.

Figure 4:
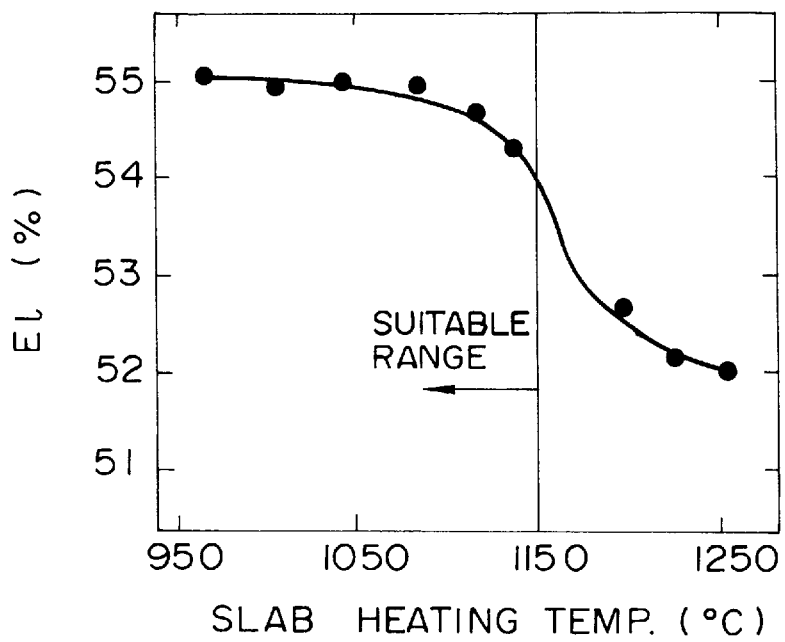
FIG. 4 is a graph showing the influence of slab heating temperature on the El values of a steels.

Influence of the slab heating temperature on the El (Elongation) property of thus-obtained cold-rolled steel sheets was examined to obtain the results as shown in FIG. 4.

As will be understood from FIG. 4, the El property of the cold-rolled steel sheet showed substantial dependency on the slab heating temperature. More specifically, a high El value of about 54% or higher could be obtained by setting the slab heating temperature to about 1150° C. or less.

Such dependency of the El property on the slab heating temperature is considered to be attributable to precipitates in the hot-rolled steel sheets. More specifically, it is considered that, in steels containing suitable amounts of tramp elements such as Cu and Ni, coarsening of the precipitates is not impeded by virtue of the slab heating temperature of about 1150° C. or lower, although the crystal grains are refined in the steel sheet as hot rolled, so that growth of the crystal grains is promoted during the cold rolling and the subsequent annealing, thus offering high El values.

This advantageous effect is remarkable particularly when all the approximate conditions of $C \leq 0.005$ wt %, $0.0040 \leq N \leq 0.0090$ wt % and $0.0015 \leq Cu/64+Ni/59 \leq 0.0150$ are simultaneously satisfied.

However, reduction of the slab heating temperature down below about 900° C. does not provide further improvement of workability. Rather, difficulties are experienced due to increase of rolling reduction, when the slab heating temperature is reduced to such a low level. In the present invention, therefore, the lower limit of the heating temperature should be about 900° C. Hot rolling step:

In order that the crystal grains in the hot-rolled steel sheet are refined through the hot rolling, it is necessary that the total rolling reduction in the hot rolling is about 70% or higher. The hot rolling finishing temperature (FDT) may fall within the γ-phase at temperature not lower than Ar$_3$transformation temperature or α-phase at temperature below this transformation temperature. In general, however, a too low finishing temperature increases the rolling reduction imposed during the hot rolling. The hot rolling finishing temperature, therefore, is limited to about 600° C. or higher.

Coiling step:

From the view point of coarsening of carbides, nitrides and TiS, it is desirable that the steel sheets as hot rolled are coiled at higher temperature. However, a too high coiling temperature poses problems such as thickening of scale. For this reason, the coiling temperature is limited to about 800° C. or below.

Cold rolling step:

Cold rolling step is essential for the purpose of achieving high r value. To this end, the cold rolling has to be conducted at a cold rolling reduction of about 50% or greater.

Annealing step:

The cold-rolled steel sheet has to be subjected to recrystallizing annealing. The annealing may be performed either in accordance with box-annealing method or in accordance with continuous annealing method. The annealing temperature has to be about 600° C. or higher, and the annealing time has to be about 5 seconds or longer. This is because an annealing temperature below about 600° C. or an annealing time shorter than about 5 seconds cannot complete the recrystallization, failing to provide the required high degree of deep drawability.

In order to achieve a further improvement in deep drawability, it is preferred that the annealing is conducted at a temperature of about 800° C. or higher for a time which is about 5 seconds or longer.

The steel sheets after the annealing may be subjected to a temper rolling for the purpose of profiling or levelling, control of surface roughness, and so forth.

The cold-rolled steel sheet of the invention thus obtained can be used not only as workable cold-rolled steel sheet as it is, but also as the black sheet material for a surface-treated workable steel sheet. The surface treatment may be galvanization inclusive of plating with alloy system, tin plating, porcelain enameling.

The steel sheet in accordance with the present invention may also be subjected, subsequent to annealing or galvanization, a suitable treatment for the purpose of improving properties such as formability, weldability, press-workability and corrosion resistance.

EXAMPLE

Example 1

A molten steel having the following composition was produced from suitably prepared iron scrap, by means of an electric furnace having a capacity of 100 tons, furnace inside diameter of 7 m, transformer power of 100 MVA and electrode size of 28 inches: C: 0.06 wt %, Cu: 0.8 wt %, Ni: 0.8 wt %, S: 0.010 wt %, N: 0.0065 wt %

The molten steel was discharged into a ladle at a temperature of 1630° C. and was placed in an RH degassing furnace (0.1 Torr) in which alloy components were added while the steel is being degassed, whereby the composition was adjusted as follows:

C: 0.0022 wt %, Si: 0.02 wt %, Mn: 0.03 wt %, P: 0.01 wt %,

Al: 0.03 wt %, S: 0.010 wt %, C: 0.003 wt %, N: 0.0055 wt %,

Ti: 0.065 wt %, Cu: 0.8 wt %, Ni: 0.8 wt %

The molten steel thus obtained was continuously cast to form a slab. The slab was then formed into hot-rolled steel sheets of 3.5 mm thick, through hot rolling conducted under the conditions shown in Table 1 which also shows mechanical properties as observed with these steel sheets. The tensile characteristic was measured on tensile test piece prepared in accordance with JIS 5.

TABLE 1

| | Hot Rolling Conditions | | | | Mechanical Properties | | | |
|---|---|---|---|---|---|---|---|---|
| No. | SRT (°C.) | FDT (°C.) | Total Rolling Reduction (%) | CT (°C.) | YS | TS | EL | Remarks |
| 1 | 1150 | 880 | 98 | 650 | 22 | 35 | 50 | Example |
| 2 | 1050 | 880 | 98 | 650 | 21 | 34 | 51 | Example |
| 3 | 1050 | 820 | 98 | 720 | 15 | 33 | 53 | Example |
| 4 | 1050 | 720 | 65 | 550 | 35 | 40 | 15 | Comp. Ex. |

As will be understood from Table 1, steel sheets labeled "Example" were produced in accordance with the invention and showed superior mechanical properties.

Example 2

Molten pig iron having the following composition and suitably selected iron scrap were mixed at a pig iron-to-scrap ratio of 40:60, and molten steel having the following composition was produced from this mixture material, using the same electric furnace as that used in Example 1.

Composition of molten pig iron:

C: 4.50 wt %, Si: 0.15 wt %, Mn: 0.30 wt %, P: 0.090 wt %,

S: 0.008 wt %

Composition of molten steel:

C: 0.06 wt %, Cu: 0.7 wt %, Ni: 0.9 wt %, S: 0.010 wt %, N: 0.0060 wt %

The molten steel was discharged into a ladle at a temperature of 1635° C. and was placed in an RH degassing furnace (0.1 Torr) in which alloy components were added while the steel was being degassed, whereby the composition was adjusted as follows:

C: 0.0021 wt %, Si: 0.01 wt %, Mn: 0.04 wt %, P: 0.01 wt %,

Al: 0.03 wt %, S: 0.011 wt %, 0: 0.003 wt %, N: 0.0062 wt %,

Ti: 0.058 wt %, Cu: 0.7 wt %, Ni: 0.9 wt %

The molten steel thus obtained was continuously cast to form a slab. The slab was then formed into hot-rolled steel sheets 3.5 mm thick, through hot rolling conducted under the conditions shown in Table 2. These hot-rolled steel sheets were subjected to cold rolling and recrystallizing annealing conducted under conditions which also are shown in Table 2, whereby cold-rolled steel sheets 0.8 mm thick were obtained. Mechanical properties measured with these cold-rolled steel sheets are also shown in Table 2.

The r value was determined in accordance with the following formula as the average of the values measured by a three-point measuring method on each test piece to which a pre-tension of 15% had been given, and by a JIS-5 tensile tester.

$$r = (r_L + 2r_D + r_C)/4$$

where, r: Lankford value (r value)

$r_L$: value measured in the rolling direction $r_C$: value measured in direction perpendicular to the rolling direction $r_D$: value measured in the direction 45° to the rolling direction

TABLE 2

| | Hot Rolling Conditions | | | | Cold Rolling | Annealing | Mechanical Properties | | | | |
|---|---|---|---|---|---|---|---|---|---|---|---|
| No. | SRT (°C.) | FDT (°C.) | Total Rolling Reduction (%) | CT (°C.) | Ratio (%) | Conditions | YS | TS | EL | r Value | Remarks |
| 1 | 1250 | 890 | 98 | 600 | 77 | 830° C. - 20 s | 16 | 32 | 50 | 2.0 | Example |
| 2 | 1150 | 880 | 98 | 600 | 77 | 830° C. - 20 s | 16 | 32 | 51 | 2.1 | Example |
| 3 | 1050 | 840 | 98 | 720 | 77 | 830° C. - 20 s | 14 | 32 | 52 | 2.0 | Example |
| 4 | 1150 | 890 | 98 | 600 | 77 | 580° C. - 20 s | 34 | 41 | 16 | 1.0 | Com. Ex. |

Com. Ex.: Comparative Example

As will be seen from Table 2, the steel sheets produced in accordance with the invention exhibited superior mechanical properties.

Example 3

Molten steels of compositions as shown in Table 3 were prepared by the same electric furnace-vacuum degassing process as that employed in Example 2.

The molten steels were continuously cast and hot rolled under the conditions as shown in Table 4 into hot-rolled steel sheets 3.5 mm thick, followed by cold rolling conducted under the conditions shown in Table 4, whereby cold-rolled steel sheets 0.8 mm thick were obtained. Some of these cold-rolled steel sheets were sent to a continuous annealing line so as to undergo recrystallizing annealing conducted at 830° C. for 20 seconds, while some of remaining cold-rolled steel sheets were sent to a galvanizing line so as to undergo recrystallizing annealing conducted at 830° C. for 20 seconds, followed by galvanization. Mechanical properties of each were measured on these cold-rolled steel sheets and galvanized steel sheets, the results being shown in Tables 4 and 5.

TABLE 3

| STEEL TYPE | C | Si | Mn | P | S | Al | N | Ti | Nb | B |
|---|---|---|---|---|---|---|---|---|---|---|
| A | 0.0023 | 0.02 | 0.05 | 0.015 | 0.016 | 0.032 | 0.0065 | 0.058 | 0.004 | — |
| B | 0.0018 | 0.02 | 0.03 | 0.018 | 0.016 | 0.033 | 0.0048 | 0.066 | 0.002 | — |
| C | 0.0025 | 0.01 | 0.04 | 0.022 | 0.017 | 0.029 | 0.0055 | 0.071 | — | — |
| D | 0.0012 | 0.02 | 0.06 | 0.012 | 0.015 | 0.031 | 0.0056 | 0.048 | 0.006 | 0.0005 |
| E | 0.0032 | 0.01 | 0.04 | 0.018 | 0.016 | 0.033 | 0.0065 | 0.068 | 0.003 | — |
| F | 0.0045 | 0.02 | 0.05 | 0.011 | 0.015 | 0.058 | 0.0049 | — | 0.042 | — |
| G | 0.0022 | 0.52 | 0.85 | 0.052 | 0.017 | 0.039 | 0.0055 | 0.049 | 0.006 | 0.0010 |
| H | 0.0035 | 0.02 | 0.15 | 0.012 | 0.016 | 0.035 | 0.0062 | — | — | — |
| I | 0.0022 | 0.02 | 0.22 | 0.015 | 0.017 | 0.037 | 0.0115 | 0.072 | — | — |
| J | 0.0015 | 0.02 | 0.18 | 0.018 | 0.015 | 0.033 | 0.0058 | 0.058 | — | — |

| STEEL TYPE | Cu | Ni | Cr | Mn | Sb | Sn | V | Zn | Co | Remarks |
|---|---|---|---|---|---|---|---|---|---|---|
| A | 0.71 | 0.53 | 0.03 | 0.01 | 0.003 | 0.015 | 0.001 | 0.003 | 0.005 | Example |
| B | 0.66 | 0.52 | 0.05 | 0.02 | 0.003 | 0.020 | 0.001 | 0.005 | 0.006 | Example |
| C | 0.61 | 0.49 | — | — | — | — | — | — | — | Example |
| D | 0.71 | 0.66 | 0.03 | 0.01 | 0.004 | 0.016 | 0.001 | 0.004 | 0.005 | Example |
| E | 0.72 | 0.71 | — | — | — | — | — | — | — | Example |
| F | 0.71 | 0.91 | 0.02 | 0.03 | 0.003 | 0.016 | 0.001 | 0.003 | 0.004 | Example |
| G | 0.82 | 0.80 | 0.12 | 0.01 | 0.004 | 0.015 | 0.002 | 0.004 | 0.006 | Example |
| H | 0.80 | 0.71 | 0.09 | 0.02 | 0.004 | 0.011 | 0.001 | 0.003 | 0.005 | Com. Ex. |
| I | 0.81 | 0.51 | 0.05 | 0.03 | 0.004 | 0.011 | 0.001 | 0.005 | 0.006 | Com. Ex. |
| J | 0.75 | 0.48 | 0.06 | 0.05 | 0.003 | 0.020 | 0.001 | 0.004 | 0.008 | Com. Ex. |

Com. Ex: Comparative Example

TABLE 4

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | Total Rolling Reduction (%) | CT (°C.) | Rolling Ratio (%) | Annealing Conditions | YS | TS | EL | r Value | Remarks |
| 1 | A | 1050 | 890 | 98 | 600 | 77 | 830° C. - 20 s | 14 | 32 | 51 | 2.2 | Example |
| 2 | B | 1150 | 880 | 98 | 600 | 77 | 830° C. - 20 s | 15 | 32 | 50 | 2.1 | Example |
| 3 | C | 1050 | 880 | 98 | 600 | 77 | 830° C. - 20 s | 14 | 32 | 51 | 2.2 | Example |
| 4 | D | 950 | 820 | 98 | 720 | 77 | 830° C. - 20 s | 10 | 31 | 53 | 2.0 | Example |
| 5 | E | 1050 | 890 | 98 | 600 | 77 | 830° C. - 20 s | 14 | 32 | 51 | 2.2 | Example |
| 6 | F | 1150 | 880 | 98 | 600 | 77 | 830° C. - 20 s | 15 | 33 | 50 | 1.9 | Example |
| 7 | G | 1150 | 880 | 98 | 600 | 77 | 830° C. - 20 s | 19 | 40 | 44 | 2.0 | Example |
| 8 | H | 1150 | 880 | 98 | 550 | 77 | 830° C. - 20 s | 23 | 32 | 42 | 1.3 | Comp. Ex. |
| 9 | I | 1150 | 880 | 98 | 550 | 77 | 830° C. - 20 s | 20 | 32 | 45 | 1.5 | Comp. Ex. |
| 10 | J | 1150 | 880 | 98 | 550 | 77 | 830° C. - 20 s | 25 | 36 | 40 | 1.4 | Comp. Ex. |

Comp. Ex.: Comparative Example

TABLE 5

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | Total Rolling Reduction (%) | CT (°C.) | Rolling Ratio (%) | Annealing Conditions | YS | TS | EL | r Value | Remarks |
| 1 | A | 1050 | 890 | 98 | 600 | 77 | 830° C. - 20 s | 14 | 32 | 50 | 2.1 | Example |
| 2 | B | 1150 | 880 | 98 | 600 | 77 | 830° C. - 20 s | 15 | 32 | 49 | 2.0 | Example |
| 3 | C | 1050 | 880 | 98 | 600 | 77 | 830° C. - 20 s | 14 | 32 | 50 | 2.1 | Example |
| 4 | D | 950 | 820 | 98 | 720 | 77 | 830° C. - 20 s | 10 | 31 | 52 | 1.9 | Example |
| 5 | E | 1050 | 890 | 98 | 600 | 77 | 830° C. - 20 s | 14 | 32 | 50 | 2.1 | Example |
| 6 | F | 1150 | 880 | 98 | 600 | 77 | 830° C. - 20 s | 15 | 33 | 49 | 1.9 | Example |
| 7 | G | 1150 | 880 | 98 | 600 | 77 | 830° C. - 20 s | 19 | 40 | 43 | 1.9 | Example |
| 8 | H | 1150 | 880 | 98 | 550 | 77 | 830° C. - 20 s | 23 | 32 | 49 | 1.1 | Comp. Ex. |

TABLE 5-continued

| | | Hot Rolling Conditions | | | Cold | | Mechanical Properties | | | | |
|---|---|---|---|---|---|---|---|---|---|---|---|
| Steel No. | Steel Type | SRT (°C.) | FDT (°C.) | Total Rolling Reduction (%) | CT (°C.) | Rolling Ratio (%) | Annealing Conditions | YS | TS | EL | r Value | Remarks |
| 9 | I | 1150 | 880 | 98 | 550 | 77 | 830° C. - 20 s | 20 | 32 | 43 | 1.3 | Comp. Ex. |
| 10 | J | 1150 | 880 | 98 | 550 | 77 | 830° C. - 20 s | 25 | 36 | 39 | 1.2 | Comp. Ex. |

Comp. Ex.: Comparative Example

As will be seen from Tables 4 and 5, Samples of Example steel sheets in accordance with the present invention showed superior mechanical properties.

Example 4

Molten steels having compositions as shown in Table 6 were prepared by electric furnace-vacuum degassing from materials composed mainly of iron scrap.

The molten steels were continuously cast and hot rolled under the conditions as shown in Table 7 into hot-rolled steel sheets 3.5 mm thick, followed by cold rolling conducted under the conditions shown in Table 7, whereby cold-rolled steel sheets 0.8 mm thick were obtained. Some of these cold-rolled steel sheets were sent to a continuous annealing line so as to undergo recrystallizing annealing conducted under the conditions shown in Table 7, while some of the remainder of the cold-rolled steel sheets were sent to a galvanizing line so as to undergo recrystallizing annealing and subsequent galvanization executed under the conditions shown in Table 8. Mechanical properties were measured on these cold-rolled steel sheets and galvanized steel sheets, the results being shown in Tables 7 and 8.

TABLE 6-1

| STEEL TYPE | C | Si | Mn | P | S | Al | N | Ti | Nb | B | Cu | Ni |
|---|---|---|---|---|---|---|---|---|---|---|---|---|
| A | 0.0022 | 0.02 | 0.15 | 0.014 | 0.015 | 0.033 | 0.0064 | 0.056 | 0.003 | — | 0.20 | 0.23 |
| B | 0.0019 | 0.02 | 0.16 | 0.016 | 0.016 | 0.034 | 0.0049 | 0.065 | — | 0.0004 | 0.36 | 0.42 |
| C | 0.0023 | 0.01 | 0.15 | 0.021 | 0.016 | 0.028 | 0.0054 | 0.072 | — | — | 0.21 | 0.19 |
| D | 0.0015 | 0.02 | 0.16 | 0.013 | 0.014 | 0.032 | 0.0055 | 0.049 | 0.005 | 0.0005 | 0.21 | 0.22 |
| E | 0.0030 | 0.01 | 0.16 | 0.015 | 0.015 | 0.032 | 0.0063 | 0.065 | 0.004 | — | 0.78 | 0.71 |
| F | 0.0046 | 0.02 | 0.15 | 0.012 | 0.016 | 0.053 | 0.0048 | 0.062 | 0.003 | — | 0.02 | 0.02 |
| G | 0.0023 | 0.52 | 0.82 | 0.053 | 0.015 | 0.036 | 0.0056 | 0.049 | 0.005 | 0.0010 | 0.82 | 0.80 |
| H | 0.0033 | 0.02 | 0.16 | 0.013 | 0.015 | 0.033 | 0.0063 | — | — | — | 0.80 | 0.71 |
| I | 0.0025 | 0.02 | 0.22 | 0.014 | 0.016 | 0.035 | 0.0119 | 0.073 | — | — | 0.81 | 0.51 |
| J | 0.0160 | 0.02 | 0.16 | 0.019 | 0.015 | 0.034 | 0.0056 | 0.056 | — | — | 0.75 | 0.48 |

TABLE 6-2

| STEEL TYPE | Cr | Mo | Sb | Sn | V | Zn | Co | O | X | Y | REMARKS |
|---|---|---|---|---|---|---|---|---|---|---|---|
| A | 0.03 | 0.01 | 0.003 | 0.013 | 0.001 | 0.003 | 0.005 | 0.004 | 0.0005 | 0.0070 | Invention |
| B | 0.05 | 0.02 | 0.003 | 0.020 | 0.001 | 0.004 | 0.006 | 0.003 | 0.0008 | 0.0127 | Invention |
| C | — | — | — | — | — | — | — | 0.005 | 0.0009 | 0.0065 | Invention |
| D | 0.03 | 0.01 | 0.004 | 0.016 | 0.001 | 0.003 | 0.005 | 0.003 | 0.0005 | 0.0070 | Invention |
| E | 0.04 | 0.01 | 0.005 | 0.013 | 0.001 | 0.004 | 0.005 | 0.003 | 0.0007 | 0.0242 | Com. Ex. |
| F | — | — | — | — | — | — | — | 0.005 | 0.0006 | 0.0007 | Com. Ex. |
| G | 0.12 | 0.01 | 0.004 | 0.015 | 0.002 | 0.004 | 0.006 | 0.004 | 0.0004 | 0.0264 | Com. Ex. |
| H | 0.09 | 0.02 | 0.004 | 0.011 | 0.001 | 0.003 | 0.005 | 0.004 | −0.0007 | 0.0245 | Com. Ex. |
| I | 0.05 | 0.03 | 0.004 | 0.011 | 0.001 | 0.005 | 0.006 | 0.003 | 0.0005 | 0.0213 | Com. Ex. |
| J | 0.06 | 0.05 | 0.003 | 0.020 | 0.001 | 0.004 | 0.008 | 0.003 | −0.0006 | 0.0199 | Com. Ex. |

$X = Ti/48 - (N/14 + S^*/32) - C/12$.
$S^* = 32(S/32 - 0.3Mn/55)$.
$S^* \geq 0$
$Y = Cu/64 + NI/59$
Com. Ex.: Comparative Example

TABLE 7

| No. | Steel Type | Hot Rolling Conditions | | | | Cold Rolling Ratio (%) | Annealing Conditions | Mechanical Properties | | | | Remarks |
|---|---|---|---|---|---|---|---|---|---|---|---|---|
| | | SRT (°C.) | FDT (°C.) | CT (°C.) | Total Rolling Reduction (%) | | | YS (kgf/mm$^2$) | TS (kgf/mm$^2$) | EL (%) | r Value | |
| 1 | A | 1250 | 890 | 600 | 98 | 77 | 830° C. - 20 s | 13 | 31 | 52 | 2.5 | Invention |
| 2 | A | 1250 | 890 | 600 | 98 | 77 | 580° C. - 20 s | 31 | 42 | 18 | 1.0 | Comp. Ex. |
| 3 | A | 1250 | 580 | 500 | 65 | 77 | 700° C. - 20 s | 22 | 33 | 42 | 1.3 | Comp. Ex. |
| 4 | B | 1250 | 880 | 600 | 98 | 77 | 830° C. - 20 s | 14 | 31 | 52 | 2.4 | Invention |
| 5 | C | 1250 | 880 | 600 | 98 | 77 | 830° C. - 20 s | 13 | 30 | 53 | 2.4 | Invention |
| 6 | D | 1250 | 890 | 600 | 98 | 77 | 830° C. - 20 s | 13 | 31 | 52 | 2.4 | Invention |
| 7 | E | 1250 | 890 | 600 | 98 | 77 | 830° C. - 20 s | 14 | 32 | 51 | 2.2 | Comp. Ex. |
| 8 | F | 1250 | 880 | 600 | 98 | 77 | 830° C. - 20 s | 13 | 30 | 51 | 2.0 | Comp. Ex. |
| 9 | G | 1250 | 880 | 600 | 98 | 77 | 830° C. - 20 s | 19 | 40 | 44 | 2.0 | Comp. Ex. |
| 10 | H | 1250 | 88Q | 550 | 98 | 77 | 830° C. - 20 s | 24 | 32 | 42 | 1.2 | Comp. Ex. |
| 11 | I | 1250 | 880 | 550 | 98 | 77 | 830° C. - 20 s | 21 | 32 | 45 | 1.4 | Comp. Ex. |
| 12 | J | 1250 | 880 | 550 | 98 | 77 | 830° C. - 20 s | 25 | 36 | 40 | 1.3 | Comp. Ex. |

Comp. Ex.: Comparative Example

TABLE 8

| No. | Steel Type | Hot Rolling Conditions | | | | Cold Rolling Ratio (%) | Annealing Conditions | Mechanical Properties | | | | Remarks |
|---|---|---|---|---|---|---|---|---|---|---|---|---|
| | | SRT (°C.) | FDT (°C.) | CT (°C.) | Total Rolling Reduction (%) | | | YS (kgf/mm$^2$) | TS (kgf/mm$^2$) | EL (%) | r Value | |
| 1 | A | 1250 | 890 | 600 | 98 | 77 | 830° C. - 20 s | 13 | 31 | 52 | 2.4 | Invention |
| 2 | A | 1250 | 890 | 600 | 98 | 77 | 580° C. - 20 s | 31 | 42 | 18 | 0.9 | Comp. Ex. |
| 3 | A | 1250 | 580 | 500 | 65 | 77 | 700° C. - 20 s | 22 | 33 | 41 | 1.2 | Comp. Ex. |
| 4 | B | 1250 | 880 | 600 | 98 | 77 | 830° C. - 20 s | 14 | 31 | 51 | 2.3 | Invention |
| 5 | C | 1250 | 880 | 600 | 98 | 77 | 830° C. - 20 s | 13 | 30 | 52 | 2.3 | Invention |
| 6 | D | 1250 | 890 | 600 | 98 | 77 | 830° C. - 20 s | 13 | 31 | 51 | 2.3 | Invention |
| 7 | E | 1250 | 890 | 600 | 98 | 77 | 830° C. - 20 s | 14 | 32 | 50 | 2.1 | Comp. Ex. |
| 8 | F | 1250 | 880 | 600 | 98 | 77 | 830° C. - 20 s | 13 | 30 | 50 | 1.9 | Comp. Ex. |
| 9 | G | 1250 | 880 | 600 | 98 | 77 | 830° C. - 20 s | 19 | 40 | 43 | 1.9 | Comp. Ex. |
| 10 | H | 1250 | 880 | 550 | 98 | 77 | 830° C. - 20 s | 24 | 32 | 41 | 1.1 | Comp. Ex. |
| 11 | I | 1250 | 880 | 550 | 98 | 77 | 830° C. - 20 s | 21 | 32 | 44 | 1.3 | Comp. Ex. |
| 12 | J | 1250 | 880 | 550 | 98 | 77 | 830° C. - 20 s | 25 | 36 | 39 | 1.2 | Comp. Ex. |

Comp. Ex.: Comparative Example

As will be seen from Tables 7 and 8, samples of workable mild steel sheets, cold-rolled steel sheet and galvanized steel sheets as Examples of the steel sheet in accordance with the invention showed superior deep drawability over those of the Comparative Examples.

Example 5

Molten steels having compositions as shown in Table 9 were prepared by an electric furnace-vacuum degassing process from materials composed mainly of iron scrap.

The molten steels were continuously cast and hot rolled under the conditions as shown in Table 10 into hot-rolled steel sheets 3.5 mm thick, followed by cold rolling conducted under the conditions shown in Table 11, whereby cold-rolled steel sheets 0.8 mm thick were obtained. Some of these cold-rolled steel sheets were sent to a continuous annealing line so as to undergo recrystallizing annealing conducted under the conditions shown in Table 10, while the remainder of the cold-rolled steel sheets were sent to a galvanizing line so as to undergo recrystallizing annealing and subsequent galvanization executed under the conditions shown in Table 11.

Mechanical properties were measured on these cold-rolled steel sheets and galvanized steel sheets, the results being shown in Tables 10 and 11.

TABLE 9-1

| STEEL TYPE | C | Si | Mn | P | S | Al | N | Ti | Nb | B | Cu | Ni |
|---|---|---|---|---|---|---|---|---|---|---|---|---|
| A | 0.0021 | 0.02 | 0.15 | 0.014 | 0.014 | 0.032 | 0.0063 | 0.057 | 0.003 | — | 0.20 | 0.23 |
| B | 0.0020 | 0.02 | 0.16 | 0.016 | 0.015 | 0.035 | 0.0048 | 0.066 | — | 0.0004 | 0.36 | 0.42 |
| C | 0.0022 | 0.01 | 0.15 | 0.021 | 0.016 | 0.029 | 0.0054 | 0.073 | — | — | 0.21 | 0.19 |
| D | 0.0016 | 0.02 | 0.15 | 0.013 | 0.015 | 0.032 | 0.0053 | 0.048 | 0.005 | 0.0005 | 0.21 | 0.22 |
| E | 0.0031 | 0.01 | 0.16 | 0.015 | 0.015 | 0.033 | 0.0062 | 0.064 | 0.004 | — | 0.78 | 0.71 |
| F | 0.0043 | 0.02 | 0.15 | 0.012 | 0.015 | 0.038 | 0.0049 | 0.066 | 0.003 | — | 0.02 | 0.02 |
| G | 0.0022 | 0.52 | 0.82 | 0.053 | 0.016 | 0.035 | 0.0057 | 0.047 | 0.005 | 0.0010 | 0.82 | 0.80 |
| H | 0.0032 | 0.02 | 0.16 | 0.013 | 0.015 | 0.036 | 0.0065 | — | — | — | 0.80 | 0.71 |
| I | 0.0024 | 0.02 | 0.22 | 0.014 | 0.016 | 0.037 | 0.0118 | 0.072 | — | — | 0.81 | 0.51 |
| J | 0.0170 | 0.02 | 0.16 | 0.019 | 0.015 | 0.033 | 0.0057 | 0.055 | — | — | 0.75 | 0.48 |

TABLE 9-2

| STEEL TYPE | Cr | Mo | Sb | Sn | V | Zn | Co | O | X | Y | REMARKS |
|---|---|---|---|---|---|---|---|---|---|---|---|
| A | 0.02 | 0.01 | 0.003 | 0.013 | 0.001 | 0.003 | 0.005 | 0.003 | 0.0006 | 0.0070 | Invention |
| B | 0.06 | 0.02 | 0.003 | 0.020 | 0.001 | 0.004 | 0.006 | 0.004 | 0.0009 | 0.0127 | Invention |
| C | — | — | — | — | — | — | — | 0.004 | 0.0010 | 0.0065 | Invention |
| D | 0.03 | 0.01 | 0.004 | 0.016 | 0.001 | 0.003 | 0.005 | 0.003 | 0.0005 | 0.0070 | Invention |
| E | 0.04 | 0.01 | 0.005 | 0.013 | 0.001 | 0.004 | 0.005 | 0.003 | 0.0006 | 0.0242 | Com. Ex. |
| F | — | — | — | — | — | — | — | 0.005 | 0.0007 | 0.0007 | Com. Ex. |
| G | 0.12 | 0.01 | 0.004 | 0.015 | 0.002 | 0.004 | 0.006 | 0.004 | 0.0004 | 0.0264 | Com. Ex. |
| H | 0.09 | 0.02 | 0.004 | 0.011 | 0.001 | 0.003 | 0.005 | 0.003 | −0.0007 | 0.0245 | Com. Ex. |
| I | 0.05 | 0.03 | 0.004 | 0.011 | 0.001 | 0.005 | 0.006 | 0.003 | 0.0005 | 0.0213 | Com. Ex. |
| J | 0.06 | 0.05 | 0.003 | 0.020 | 0.001 | 0.004 | 0.008 | 0.004 | −0.0007 | 0.0199 | Com. Ex. |

$X = Ti/48 - (N/14 + S^*/32) - C/12$.
$S^* = 32(S/32 - 0.3Mn/55)$.
$S^* \geq 0$
$Y = Cu/64 + Ni/59$
Com. Ex.: Comparative Example

TABLE 10

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | CT (°C.) | Total Rolling Reduction (%) | Rolling Ratio (%) | Annealing Conditions | YS (kgf/mm$^2$) | TS (kgf/mm$^2$) | EL (%) | r Value | Remarks |
| 1 | A | 950 | 830 | 710 | 98 | 77 | 830° C. - 20 s | 12 | 31 | 55 | 2.4 | Invention |
| 2 | A | 1050 | 890 | 600 | 98 | 77 | 830° C. - 20 s | 12 | 31 | 55 | 2.5 | Invention |
| 3 | A | 1250 | 890 | 500 | 98 | 77 | 830° C. - 20 s | 13 | 31 | 52 | 2.5 | Invention |
| 4 | B | 1050 | 880 | 600 | 98 | 77 | 830° C. - 20 s | 13 | 31 | 55 | 2.4 | Invention |
| 5 | C | 1050 | 880 | 600 | 98 | 77 | 830° C. - 20 s | 12 | 30 | 56 | 2.4 | Invention |
| 6 | D | 1050 | 890 | 600 | 98 | 77 | 830° C. - 20 s | 12 | 31 | 55 | 2.4 | Invention |
| 7 | D | 1250 | 890 | 600 | 98 | 77 | 830° C. - 20 s | 13 | 31 | 52 | 2.4 | Invention |
| 8 | E | 1050 | 890 | 600 | 98 | 77 | 830° C. - 20 s | 14 | 32 | 51 | 2.2 | Comp. Ex. |
| 9 | F | 1050 | 880 | 600 | 98 | 77 | 830° C. - 20 s | 13 | 30 | 51 | 2.0 | Comp. Ex. |
| 10 | G | 1050 | 880 | 600 | 98 | 77 | 830° C. - 20 s | 18 | 39 | 45 | 2.0 | Comp. Ex. |
| 11 | H | 1050 | 880 | 550 | 98 | 77 | 830° C. - 20 s | 22 | 32 | 43 | 1.2 | Comp. Ex. |
| 12 | I | 1250 | 880 | 550 | 98 | 77 | 830° C. - 20 s | 21 | 32 | 45 | 1.4 | Comp. Ex. |
| 13 | J | 1050 | 880 | 550 | 98 | 77 | 830° C. - 20 s | 24 | 35 | 41 | 1.3 | Comp. Ex. |

Comp. Ex.: Comparative Example

TABLE 11

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | CT (°C.) | Total Rolling Reduction (%) | Rolling Ratio (%) | Annealing Conditions | YS (kgf/mm$^2$) | TS (kgf/mm$^2$) | EL (%) | r Value | Remarks |
| 1 | A | 950 | 830 | 710 | 98 | 77 | 830° C. - 20 s | 12 | 31 | 54 | 2.3 | Invention |
| 2 | A | 1050 | 890 | 600 | 98 | 77 | 830° C. - 20 s | 12 | 31 | 54 | 2.4 | Invention |
| 3 | A | 1250 | 890 | 500 | 98 | 77 | 830° C. - 20 s | 13 | 31 | 51 | 2.4 | Invention |
| 4 | B | 1050 | 880 | 600 | 98 | 77 | 830° C. - 20 s | 13 | 31 | 54 | 2.3 | Invention |
| 5 | C | 1050 | 880 | 600 | 98 | 77 | 830° C. - 20 s | 12 | 30 | 55 | 2.3 | Invention |
| 6 | D | 1050 | 890 | 600 | 98 | 77 | 830° C. - 20 s | 12 | 31 | 54 | 2.3 | Invention |
| 7 | D | 1250 | 890 | 600 | 98 | 77 | 830° C. - 20 s | 13 | 31 | 51 | 2.3 | Invention |
| 8 | E | 1050 | 890 | 600 | 98 | 77 | 830° C. - 20 s | 14 | 32 | 50 | 2.1 | Comp. Ex. |
| 9 | F | 1050 | 880 | 600 | 98 | 77 | 830° C. - 20 s | 13 | 30 | 50 | 1.9 | Comp. Ex. |
| 10 | G | 1050 | 880 | 600 | 98 | 77 | 830° C. - 20 s | 18 | 39 | 44 | 1.9 | Comp. Ex. |
| 11 | H | 1050 | 880 | 550 | 98 | 77 | 830° C. - 20 s | 22 | 32 | 42 | 1.1 | Comp. Ex. |
| 12 | I | 1250 | 880 | 550 | 98 | 77 | 830° C. - 20 s | 21 | 32 | 44 | 1.3 | Comp. Ex. |
| 13 | J | 1050 | 880 | 550 | 98 | 77 | 830° C. - 20 s | 24 | 35 | 40 | 1.2 | Comp. Ex. |

Comp. Ex.: Comparative Example

As will be seen from Tables 10 and 11, Samples of cold-rolled steel sheets and galvanized steel sheets as Examples of the invention showed superior deep drawability over the Comparative Examples.

In particular, excellent El properties were obtained when the slab heating temperature was set to 1150° C. or less.

Example 6

Molten steels having compositions as shown in Table 12 were prepared by electric furnace-vacuum degassing process from materials composed mainly of iron scrap.

The molten steels were continuously cast and hot rolled under the conditions as shown in Table 13 into hot-rolled steel sheets 3.5 mm thick, followed by cold rolling conducted under the conditions shown in Table 13, whereby cold-rolled steel sheets 0.8 mm thick were obtained. Some of these cold-rolled steel sheets were sent to a continuous annealing line so as to undergo recrystallizing annealing conducted under the conditions shown in Table 13, while some of the remaining cold-rolled steel sheets were sent to a galvanizing line so as to undergo recrystallizing annealing and a subsequent galvanization executed under the conditions shown in Table 14. Mechanical properties were measured on these cold-rolled steel sheets and galvanized steel sheets, the results being shown in Tables 13 and 14.

TABLE 12-1

| STEEL TYPE | C | Si | Mn | P | S | Al | N | Ti | Nb | B | Cu | Ni |
|---|---|---|---|---|---|---|---|---|---|---|---|---|
| A | 0.0021 | 0.02 | 0.05 | 0.015 | 0.015 | 0.033 | 0.0064 | 0.054 | 0.003 | — | 0.19 | 0.22 |
| B | 0.0020 | 0.02 | 0.03 | 0.016 | 0.016 | 0.034 | 0.0049 | 0.063 | — | 0.0004 | 0.35 | 0.39 |
| C | 0.0022 | 0.01 | 0.05 | 0.021 | 0.016 | 0.028 | 0.0054 | 0.072 | — | — | 0.22 | 0.19 |
| D | 0.0016 | 0.02 | 0.04 | 0.013 | 0.014 | 0.032 | 0.0055 | 0.050 | 0.005 | 0.0005 | 0.20 | 0.21 |
| E | 0.0031 | 0.01 | 0.03 | 0.015 | 0.015 | 0.032 | 0.0063 | 0.064 | 0.004 | — | 0.37 | 0.20 |
| F | 0.0043 | 0.02 | 0.05 | 0.012 | 0.016 | 0.053 | 0.0048 | 0.061 | 0.003 | — | 0.02 | 0.03 |
| G | 0.0032 | 0.02 | 0.16 | 0.013 | 0.015 | 0.033 | 0.0063 | — | — | — | 0.80 | 0.71 |
| H | 0.0025 | 0.02 | 0.22 | 0.014 | 0.016 | 0.035 | 0.0119 | 0.072 | — | — | 0.81 | 0.51 |
| I | 0.0150 | 0.02 | 0.16 | 0.019 | 0.015 | 0.034 | 0.0056 | 0.055 | — | — | 0.75 | 0.48 |

TABLE 12-2

| STEEL TYPE | Cr | Mo | Sb | Sn | V | Zn | Co | O | X | Y | Z | REMARKS |
|---|---|---|---|---|---|---|---|---|---|---|---|---|
| A | 0.03 | 0.01 | 0.003 | 0.013 | 0.001 | 0.003 | 0.005 | 0.003 | 0.0003 | 0.0067 | 3.3 | Invention |
| B | 0.05 | 0.02 | 0.003 | 0.020 | 0.001 | 0.004 | 0.006 | 0.003 | 0.0005 | 0.0121 | 1.9 | Invention |
| C | — | — | — | — | — | — | — | 0.004 | 0.0007 | 0.0067 | 3.1 | Invention |
| D | 0.03 | 0.01 | 0.004 | 0.016 | 0.001 | 0.003 | 0.005 | 0.003 | 0.0003 | 0.0967 | 2.9 | Invention |
| E | 0.04 | 0.01 | 0.005 | 0.013 | 0.001 | 0.004 | 0.005 | 0.003 | 0.0003 | 0.0092 | 2.0 | Invention |
| F | — | — | — | — | — | — | — | 0.004 | 0.0003 | 0.0008 | 3.1 | Com. Ex. |
| G | 0.09 | 0.02 | 0.004 | 0.011 | 0.001 | 0.003 | 0.005 | 0.003 | −0.0007 | 0.0245 | 10.7 | Com. Ex. |
| H | 0.05 | 0.03 | 0.004 | 0.011 | 0.001 | 0.005 | 0.006 | 0.003 | 0.0004 | 0.0213 | 13.8 | Com. Ex. |
| I | 0.06 | 0.05 | 0.003 | 0.020 | 0.001 | 0.004 | 0.008 | 0.004 | −0.0005 | 0.0199 | 10.7 | Com. Ex. |

$X = Ti/48 - (N/14 + S^*/32) - C/12$.
$S^* = 32(S/32 - 0.3Mn/55)$.
$S^* \geq 0$
$Y = Cu/64 + NI/59$
$Z = Mn/S$
Com. Ex.: Comparative Example

TABLE 13

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | CT (°C.) | Total Rolling Reduction (%) | Rolling Ratio (%) | Annealing Conditions | YS (kgf/mm$^2$) | TS (kgf/mm$^2$) | EL (%) | r Value | Remarks |
| 1 | A | 1250 | 890 | 600 | 98 | 77 | 830° C. - 20 s | 13 | 31 | 52 | 2.7 | Invention |
| 2 | A | 1250 | 890 | 600 | 98 | 77 | 580° C. - 20 s | 31 | 42 | 18 | 1.0 | Comp. Ex. |
| 3 | A | 1250 | 580 | 500 | 65 | 77 | 700° C. - 20 s | 22 | 33 | 42 | 1.3 | Comp. Ex. |
| 4 | B | 1250 | 880 | 600 | 98 | 77 | 830° C. - 20 s | 14 | 31 | 52 | 2.6 | Invention |
| 5 | C | 1250 | 880 | 600 | 98 | 77 | 830° C. - 20 s | 13 | 30 | 53 | 2.6 | Invention |
| 6 | D | 1250 | 890 | 600 | 98 | 77 | 830° C. - 20 s | 13 | 31 | 52 | 2.6 | Invention |
| 7 | E | 1250 | 890 | 600 | 98 | 77 | 830° C. - 20 s | 14 | 32 | 51 | 2.6 | Invention |
| 8 | F | 1250 | 880 | 600 | 98 | 77 | 830° C. - 20 s | 13 | 30 | 51 | 2.0 | Comp. Ex. |
| 9 | G | 1250 | 880 | 550 | 98 | 77 | 830° C. - 20 s | 24 | 32 | 42 | 1.2 | Comp. Ex. |
| 10 | H | 1250 | 880 | 550 | 98 | 77 | 830° C. - 20 s | 21 | 32 | 45 | 1.4 | Comp. Ex. |
| 11 | I | 1250 | 880 | 550 | 98 | 77 | 830° C. - 20 s | 25 | 36 | 40 | 1.3 | Comp. Ex. |

Comp. Ex.: Comparative Example

TABLE 14

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | CT (°C.) | Total Rolling Reduction (%) | Rolling Ratio (%) | Annealing Conditions | YS (kgf/mm$^2$) | TS (kgf/mm$^2$) | EL (%) | r Value | Remarks |
| 1 | A | 1250 | 890 | 600 | 98 | 77 | 830° C. - 20 s | 13 | 31 | 51 | 2.6 | Invention |
| 2 | A | 1250 | 890 | 600 | 98 | 77 | 580° C. - 20 s | 31 | 42 | 18 | 0.9 | Comp. Ex. |
| 3 | A | 1250 | 580 | 500 | 65 | 77 | 700° C. - 20 s | 22 | 33 | 41 | 1.2 | Comp. Ex. |
| 4 | B | 1250 | 880 | 600 | 98 | 77 | 830° C. - 20 s | 14 | 31 | 51 | 2.5 | Invention |

TABLE 14-continued

| | | Hot Rolling Conditions | | | Cold | | Mechanical Properties | | | | |
|---|---|---|---|---|---|---|---|---|---|---|---|
| No. | Steel Type | SRT (°C.) | FDT (°C.) | CT (°C.) | Total Rolling Reduction (%) | Rolling Ratio (%) | Annealing Conditions | YS (kgf/mm²) | TS (kgf/mm²) | EL (%) | r Value | Remarks |
| 5 | C | 1250 | 880 | 600 | 98 | 77 | 830° C. - 20 s | 13 | 30 | 52 | 2.5 | Invention |
| 6 | D | 1250 | 890 | 600 | 98 | 77 | 830° C. - 20 s | 13 | 31 | 51 | 2.5 | Invention |
| 7 | E | 1250 | 890 | 600 | 98 | 77 | 830° C. - 20 s | 14 | 32 | 50 | 2.5 | Invention |
| 8 | F | 1250 | 880 | 600 | 98 | 77 | 830° C. - 20 s | 13 | 30 | 50 | 1.9 | Comp. Ex. |
| 9 | G | 1250 | 880 | 550 | 98 | 77 | 830° C. - 20 s | 24 | 32 | 41 | 1.1 | Comp. Ex. |
| 10 | H | 1250 | 880 | 550 | 98 | 77 | 830° C. - 20 s | 21 | 32 | 44 | 1.3 | Comp. Ex. |
| 11 | I | 1250 | 880 | 550 | 98 | 77 | 830° C. - 20 s | 25 | 36 | 39 | 1.2 | Comp. Ex. |

Comp. Ex.: Comparative Example

As will be seen from Tables 13 and 14, Samples of cold-rolled steel sheet and galvanized steel sheet as Examples of the steel sheet in accordance with the invention showed superior deep drawability over those of the Comparative Examples.

Example 7

Molten steels having compositions as shown in Table 15 were prepared by electric furnace-vacuum degassing process.

The molten steels were continuously cast and hot rolled under the conditions as shown in Table 16 into hot-rolled steel sheets 3.5 mm thick, followed by cold rolling conducted under the conditions shown in Table 16, whereby cold-rolled steel sheets 0.8 mm thick were obtained. Some of these cold-rolled steel sheets were sent to a continuous annealing line so as to undergo recrystallizing annealing conducted under the conditions shown in Table 16, while the remaining cold-rolled steel sheets were sent to a galvanizing line so as to undergo recrystallizing annealing and a subsequent galvanization executed under the conditions shown in Table 17. Mechanical properties were measured on these cold-rolled steel sheets and galvanized steel sheets, the results being shown in Tables 16 and 17.

TABLE 15-1

| STEEL TYPE | C | Si | Mn | P | S | Al | N | Ti | Nb | B | Cu | Ni |
|---|---|---|---|---|---|---|---|---|---|---|---|---|
| A | 0.0022 | 0.02 | 0.05 | 0.013 | 0.015 | 0.032 | 0.0063 | 0.056 | 0.003 | — | 0.22 | 0.23 |
| B | 0.0019 | 0.02 | 0.03 | 0.016 | 0.015 | 0.035 | 0.0048 | 0.065 | — | 0.0004 | 0.35 | 0.42 |
| C | 0.0021 | 0.01 | 0.06 | 0.021 | 0.016 | 0.029 | 0.0054 | 0.072 | — | — | 0.19 | 0.19 |
| D | 0.0016 | 0.02 | 0.04 | 0.013 | 0.015 | 0.032 | 0.0053 | 0.049 | 0.005 | 0.0005 | 0.20 | 0.22 |
| E | 0.0030 | 0.01 | 0.06 | 0.015 | 0.015 | 0.033 | 0.0062 | 0.065 | 0.004 | — | 0.38 | 0.21 |
| F | 0.0042 | 0.02 | 0.03 | 0.012 | 0.015 | 0.038 | 0.0049 | 0.065 | 0.003 | — | 0.02 | 0.02 |
| G | 0.0032 | 0.02 | 0.22 | 0.013 | 0.015 | 0.036 | 0.0065 | — | — | — | 0.80 | 0.71 |
| H | 0.0024 | 0.02 | 0.22 | 0.014 | 0.016 | 0.037 | 0.0118 | 0.073 | — | — | 0.81 | 0.51 |
| I | 0.0170 | 0.02 | 0.22 | 0.019 | 0.015 | 0.033 | 0.0057 | 0.056 | — | — | 0.75 | 0.48 |

TABLE 15-2

| STEEL TYPE | Cr | Mo | Sb | Sn | V | Zn | Co | O | X | Y | Z | REMARKS |
|---|---|---|---|---|---|---|---|---|---|---|---|---|
| A | 0.02 | 0.01 | 0.003 | 0.013 | 0.001 | 0.003 | 0.005 | 0.002 | 0.0003 | 0.0073 | 3.3 | Invention |
| B | 0.06 | 0.02 | 0.003 | 0.020 | 0.001 | 0.004 | 0.006 | 0.003 | 0.0005 | 0.0126 | 2.0 | Invention |
| C | — | — | — | — | — | — | — | 0.003 | 0.0008 | 0.0062 | 3.8 | Invention |
| D | 0.03 | 0.01 | 0.004 | 0.016 | 0.001 | 0.003 | 0.005 | 0.002 | 0.0003 | 0.0069 | 2.7 | Invention |
| E | 0.04 | 0.01 | 0.005 | 0.013 | 0.001 | 0.004 | 0.005 | 0.001 | 0.0005 | 0.0095 | 4.0 | Invention |
| F | — | — | — | — | — | — | — | 0.004 | 0.0003 | 0.0007 | 2.0 | Com. Ex. |
| G | 0.09 | 0.02 | 0.004 | 0.011 | 0.001 | 0.003 | 0.005 | 0.003 | −0.0007 | 0.0245 | 14.7 | Com. Ex. |
| H | 0.05 | 0.03 | 0.004 | 0.011 | 0.001 | 0.005 | 0.006 | 0.003 | 0.0005 | 0.0213 | 13.8 | Com. Ex. |
| I | 0.06 | 0.05 | 0.003 | 0.020 | 0.001 | 0.004 | 0.008 | 0.004 | −0.0007 | 0.0199 | 14.7 | Com. Ex. |

X = Ti/48 − (N/14 + S*/32) − C/12.
S* = 32(S/32 − 0.3Mn/55).
S* ≥ 0
Y = Cu/64 + NI/59
Z = Mn/S
Com. Ex.: Comparative Example

TABLE 16

| No. | Steel Type | Hot Rolling Conditions | | | | Cold Rolling Ratio (%) | Annealing Conditions | Mechanical Properties | | | r Value | Remarks |
|---|---|---|---|---|---|---|---|---|---|---|---|---|
| | | SRT (°C.) | FDT (°C.) | CT (°C.) | Total Rolling Reduction (%) | | | YS (kgf/mm²) | TS (kgf/mm²) | EL (%) | | |
| 1 | A | 950 | 830 | 710 | 98 | 77 | 830° C. - 20s | 12 | 31 | 55 | 2.6 | Invention |
| 2 | A | 1050 | 890 | 600 | 98 | 77 | 830° C. - 20s | 12 | 31 | 55 | 2.7 | Invention |
| 3 | A | 1250 | 890 | 500 | 98 | 77 | 830° C. - 20s | 13 | 31 | 52 | 2.6 | Invention |
| 4 | B | 1050 | 880 | 600 | 98 | 77 | 830° C. - 20s | 13 | 31 | 55 | 2.6 | Invention |
| 5 | C | 1050 | 880 | 600 | 98 | 77 | 830° C. - 20s | 12 | 30 | 56 | 2.6 | Invention |
| 6 | D | 1050 | 890 | 600 | 98 | 77 | 830° C. - 20s | 12 | 31 | 55 | 2.6 | Invention |
| 7 | D | 1250 | 890 | 600 | 98 | 77 | 830° C. - 20s | 13 | 31 | 52 | 2.6 | Invention |
| 8 | E | 1250 | 890 | 600 | 98 | 77 | 830° C. - 20s | 14 | 32 | 55 | 2.6 | Invention |
| 9 | F | 1050 | 880 | 600 | 98 | 77 | 830° C. - 20s | 13 | 30 | 51 | 2.0 | Comp. Ex. |
| 10 | G | 1050 | 880 | 550 | 98 | 77 | 830° C. - 20s | 22 | 32 | 43 | 1.2 | Comp. Ex. |
| 11 | H | 1250 | 880 | 550 | 98 | 77 | 830° C. - 20s | 21 | 32 | 45 | 1.4 | Comp. Ex. |
| 12 | I | 1050 | 880 | 550 | 98 | 77 | 830° C. - 20s | 24 | 35 | 41 | 1.3 | Comp. Ex. |

Comp. Ex.: Comparative Example

TABLE 17

| No. | Steel Type | Hot Rolling Conditions | | | | Cold Rolling Ratio (%) | Annealing Conditions | Mechanical Properties | | | r Value | Remarks |
|---|---|---|---|---|---|---|---|---|---|---|---|---|
| | | SRT (°C.) | FDT (°C.) | CT (°C.) | Total Rolling Reduction (%) | | | YS (kgf/mm²) | TS (kgf/mm²) | EL (%) | | |
| 1 | A | 950 | 830 | 710 | 98 | 77 | 830° C. - 20s | 12 | 31 | 54 | 2.5 | Invention |
| 2 | A | 1050 | 890 | 600 | 98 | 77 | 830° C. - 20s | 12 | 31 | 54 | 2.6 | Invention |
| 3 | A | 1250 | 890 | 500 | 98 | 77 | 830° C. - 20s | 13 | 31 | 51 | 2.5 | Invention |
| 4 | B | 1050 | 880 | 600 | 98 | 77 | 830° C. - 20s | 13 | 31 | 54 | 2.5 | Invention |
| 5 | C | 1050 | 880 | 600 | 98 | 77 | 830° C. - 20s | 12 | 30 | 55 | 2.5 | Invention |
| 6 | D | 1050 | 890 | 600 | 98 | 77 | 830° C. - 20s | 12 | 31 | 54 | 2.5 | Invention |
| 7 | D | 1250 | 890 | 600 | 98 | 77 | 830° C. - 20s | 13 | 31 | 51 | 2.5 | Invention |
| 8 | E | 1050 | 890 | 600 | 98 | 77 | 830° C. - 20s | 14 | 32 | 50 | 2.5 | Invention |
| 9 | F | 1050 | 880 | 600 | 98 | 77 | 830° C. - 20s | 13 | 30 | 50 | 1.9 | Comp. Ex. |
| 10 | G | 1050 | 880 | 550 | 98 | 77 | 830° C. - 20s | 22 | 32 | 42 | 1.1 | Comp. Ex. |
| 11 | H | 1250 | 880 | 550 | 98 | 77 | 830° C. - 20s | 21 | 32 | 44 | 1.3 | Comp. Ex. |
| 12 | I | 1050 | 880 | 550 | 98 | 77 | 830° C. - 20s | 24 | 35 | 40 | 1.2 | Comp. Ex. |

Comp. Ex.: Comparative Example

As will be seen from Tables 16 and 17, Samples of cold-rolled steel sheets and galvanized steel sheets as Examples of steel sheets in accordance with the present invention exhibited superior deep drawability over the Comparative Examples.

In particular, a superior El properties were obtained when the slab heating temperature was controlled at 1150° C or lower.

As will be understood from the foregoing description and detailed examples, the use of the present invention enables the creation of novel and highly advantageous steel sheets having high workability even as compared to steel sheets produced through the converter process, even when made from a steel material which has been produced by an electric furnace process and which contains tramp elements. This factually establishes the importance of the limitation of C and N contents of the steel to the stated predetermined ranges and addition of the specified amounts or amount of Ti and/or Nb.

In addition, by adding a suitable amount of Ti while limiting the contents of Cu and Ni as tramp elements to preselected ranges, it is now realistic to be able to obtain mild steel sheets for the purpose of working, such sheets having excellent deep drawability equivalent to that exhibited by steel sheets produced by the much more expensive converter process, even though produced from a steel material prepared through the electric furnace process and containing substantial amounts of so-called tramp elements.

By this invention it is also possible to create cold-rolled steel sheets having excellent deep drawability equivalent to converter steels, even though made from a steel material prepared through the electric furnace process and containing tramp elements. This, as will now be appreciated, can be done by limiting the contents of Cu and Ni as tramp elements to predetermined ranges, while adding a proper amount of Ti and limiting the value of the ratio Mn/S to the claimed level which is not greater than the designated predetermined value.

Furthermore, the present invention now makes it possible and practical to recycle iron scrap and to reduce installation costs, as well as steel production costs, by virtue of the use of an electric furnace in conjunction with this invention.

What is claimed is:

1. A steel having excellent workability, produced by an electric furnace-vacuum degassing process, wherein said composition comprises about:

C: 0.0050 wt % or less

Si: 1.5 wt % or less

Mn: 1.5 wt % or less

P: 0.10 wt % or less

Al: 0.10 wt % or less

S: 0.020 wt % or less

O: 0.01 wt % or less

Cu: 0.02 to 1.5 wt %

Ni: 0.02 to 2.0 wt %

Ti and/or Nb: from 0.001 to 0.10 wt %

N: from 0.0040 to 0.0090 wt %.

2. A steel having excellent workability, produced by an electric furnace-vacuum degassing process, as claimed in claim 1, wherein said composition comprises about:

Si: 0.5 wt % or less

Mn: 0.5 wt % or less

P: 0.06 wt % or less.

3. A steel having excellent workability, produced by an electric furnace-vacuum degassing process, as claimed in claim 1, and in the form of a mild steel sheet, and further comprising about:

Si: 0.2 wt % or less

Mn: 0.2 wt % or less.

4. A high-strength steel as claimed in claim 1, having excellent workability, produced by an electric furnace-vacuum degassing process, wherein said composition comprises about:

Si: 1.0 wt % or less

Mn: from 0.10 to 0.6 wt %

P: from 0.02 to 0.10 wt %.

5. A steel having excellent workability, produced by an electric furnace-vacuum degassing process, as claimed in claim 1, wherein said composition further comprises about:

C: 0.0028 wt % or less.

6. A steel having excellent workability, produced by an electric furnace-vacuum degassing process, as claimed in claim 1, wherein said composition further comprises about:

B: from 0.0001 to 0.010 wt %.

7. A steel having excellent workability, produced by an electric furnace-vacuum degassing process, as claimed in claim 1, wherein said steel composition further comprises about:

Mn: 0.05 wt % or less.

8. A mild steel having excellent workability, produced by an electric furnace-vacuum degassing process, said steel having a composition which comprises:

C: 0.0050 wt % or less

Si: 0.2 wt % or less

P: 0.10 wt % or less

Al: 0.10 wt % or less

O: 0.010 wt % or less

Mn: 0.5 wt % or less

S: 0.020 wt % or less

N: from 0.0040 to 0.0090 wt %

Ti: from 0.014 to 0.10 wt %, wherein the contents of Ti, N, S and Mn meet the condition of:

$$Ti/48-(N/14+S^*/32) \geq C/12$$

where $S^*=32(S/32-0.3Mn/55)$ said composition further containing:

Cu: 0.02 to 0.96 wt %

Ni: 0.02 to 0.88 wt %, wherein the contents of Cu and Ni meet the condition of:

$$0.0015 \leq Cu/64+Ni/59 \leq 0.0150.$$

9. A mild steel having excellent workability, produced by an electric furnace-vacuum degassing process, as claimed in claim 8, wherein said composition further comprises:

Mn: 0.14 wt % or less, and wherein the contents of Mn and S meet the approximate condition:

$Mn/S \leq 7.0$.

10. A mild steel having excellent workability, produced by an electric furnace-vacuum degassing process, as claimed in claim 8, wherein said composition further contains one or both of Nb and B selected from the group consisting of:

Nb: from about 0.001 to 0.10 wt %; and

B: from about 0.0001 to 0.010 wt %.

11. A mild steel having excellent workability, produced by an electric furnace-vacuum degassing process, as claimed in claim 8, wherein said composition comprises:

C: about 0.0028 wt % or less.

12. A mild steel having excellent workability, produced by an electric furnace-vacuum degassing process, as claimed in claim 8, wherein said composition further comprises about 0.05 wt % or less of Mn.

13. In a method of producing steel having excellent workability, the steps which comprise:

performing electric furnace degassing using as the main ferrous material iron scrap alone or iron scrap with addition of molten iron, the steps which comprises:

adjusting the steel composition in said electric furnace to a composition comprising about:

C: from 0.03 to 0.10 wt %

Cu: 0.02 to 1.5 wt %

Ni: 0.02 to 2.0 wt %

S: 0.020 wt % or less

N: from 0.0040 to 0.0150 wt % discharging said molten steel from said electric furnace at a temperature not lower than about 1580° C.;

and vacuum degassing said molten steel while adding necessary alloy components to form a steel composition which comprises about:

C: 0.0050 wt % or less

Si: 1.5 wt % or less

Mn: 1.5 wt % or less

P: 0.10 wt % or less

Al: 0.10 wt % or less

S: 0.020 wt % or less

O: 0.01 wt % or less

Cu: 0.02 to 1.5 wt %

Ni: 0.02 to 2.0 wt %

Ti and/or Nb: from 0.001 to 0.10 wt % and

N: from 0.0040 to 0.0090 wt %, and recovering the steel so produced.

14. A method of producing steel having excellent workability, produced by an electric furnace-vacuum degassing process, as claimed in claim 13, comprising the further step of adjusting the composition of said steel in said electric furnace to comprise about:

C : from 0.03 to 0.10 wt %

Cu: 0.02 to 1.5 wt %

Ni: 0.02 to 2.0 wt %

N: from 0.0040 to 0.0150 wt %, said method further comprising effecting ladle refining of said molten steel discharged from said electric furnace in a manner to adjust the S content in said molten steel to about S: 0.020 wt % before subjecting said molten steel to said degassing.

15. A method of producing steel having excellent workability, produced by an electric furnace-vacuum degassing process, as claimed in claim 13, including the further step of degassing said molten steel while adding alloy components in said vacuum-degassing furnace to adjust said composition to comprise about:

Si: 0.5 wt % or less

Mn: 0.5 wt % or less

P: 0.06 wt % or less;

said method comprising the steps of continuously casting said molten steel of said adjusted composition into a slab;

heating said slab to a temperature of from about 900° to about 1300° C.;

subjecting said heated slab to hot rolling conducted at a total rolling reduction of about 70% or higher and to a rolling finish temperature of about 600° C. or higher; and coiling the resulting hot-rolled steel at a temperature of about 800° C. or lower.

16. A method of producing steel having excellent workability, produced by an electric furnace-vacuum degassing process, as claimed in claim 13, wherein the step of degassing the molten steel while adding alloy components adjusts said composition to comprise about:

Si: 0.2 wt % or less

Mn: 0.2 wt % or less, said method comprising the steps of:
continuously casting said molten steel of said adjusted composition into a slab;
heating said slab to a temperature of from about 900° to about 1300° C.;
subjecting said heated slab to hot rolling conducted at a total rolling reduction of about 70% or higher and a rolling finish temperature of about 600° C. or higher;
taking up said hot-rolled steel at a temperature of about 800° C. or lower;
subjecting said hot-rolled steel to cold rolling conducted at a rolling reduction of about 50% or higher; and
subjecting said cold-rolled steel to annealing conducted at a temperature of about 600° C. or higher for a period of about 5 seconds or longer.

17. A method of producing steel having excellent workability, produced by an electric furnace-vacuum degassing process, as claimed in claim 13, wherein the step of degassing said molten steel while adding alloy components is conducted in regard to Si, Mn and P such as to adjust the composition to comprise about:

Si: 1.0 wt % or less

Mn: from 0.10 to 0.60 wt %

P: from 0.02 to 0.10 wt % said method comprising the steps of:
continuously casting said molten steel of said adjusted composition to a slab;
heating said slab to a temperature of from about 900° to about 1300° C.;
subjecting said heated slab to hot rolling conducted at a total rolling reduction of about 70% or higher and a rolling finish temperature of about 600° C. or higher;
taking up said hot-rolled steel at a temperature of about 800° C. or lower;
subjecting said hot-rolled steel to cold rolling conducted at a rolling reduction of about 50% or higher; and subjecting said cold-rolled steel to annealing conducted at a temperature of about 600° C. or higher for a period of about 5 seconds or longer.

18. A method of producing steel having excellent workability, produced by an electric furnace-vacuum degassing process, as claimed in claim 13, wherein the C content after the vacuum degassing is about C: 0.0028 wt % or less.

19. A method of producing steel having excellent workability, produced by an electric furnace-vacuum degassing process, as claimed in claim 13, wherein the B content after vacuum degassing is about B: from 0.0001 to 0.010 wt %.

20. A method of producing steel having excellent workability, produced by an electric furnace-vacuum degassing process, as claimed in claim 13, wherein the Mn content after vacuum degassing is about Mn: 0.05 wt % or less.

21. A method of producing steel having excellent workability, produced by an electric furnace-vacuum degassing process, as claimed in claim 13, wherein the ratio of molten iron to the total amount of the material used in said electric oven is about 80 wt % or less.

22. A method of producing steel having excellent workability, produced by an electric furnace-vacuum degassing process, as claimed in claim 13, wherein the composition of said molten iron is, before said discharging step, adjusted to about the following C and P contents:

C: from 1.2 to 5.0 wt %

P: 0.10 wt % or less.

23. A method of producing steel having excellent workability, produced by an electric furnace-vacuum degassing process, as claimed in claim 13, wherein said degassing step is conducted by a method selected from the group consisting of the RH method, the DH method and a combination of an oxygen blowing operation with said DH method or said RH method.

24. In a method of producing steel having excellent workability, the steps which comprise:
performing electric furnace degassing using as the main ferrous material iron scrap alone or iron scrap with addition of molten iron, the steps which comprise:
adjusting the steel composition in said electric furnace to comprise about:
C: from 0.03 to 0.10 wt %
Cu: 0.02 to 1.5 wt %
Ni: 0.02 to 2.0 wt %
S: 0.020 wt % or less
N: from 0.0040 to 0.0150 wt %
discharging said molten steel from said furnace at a temperature not lower than about 1580° C.;
degassing said molten steel in a vacuum while adding alloy components in amounts to obtain a steel composition which comprises about:

C: 0.0050 wt % or less

Si: 1.5 wt % or less

Mn: 1.5 wt % or less

P: 0.10 wt % or less

Al: 0.10 wt % or less

O: 0.010 wt % or less

S: 0.020 wt % or less

N: from 0.0040 to 0.0090 wt %

Ti: from 0.014 to 0.10 wt %

Cu: 0.02 to 0.96 wt %

Ni: 0.02 to 0.88 wt % wherein the adjusted composition also meets the conditions of about:

$Ti/48 - (N/14 + S*/32) \geq C/12$ where

S*=32(S/32−0.3Mn/55); and 0.0015≦Cu/64+Ni/59≦0.0150;

continuously casting said molten steel of said adjusted composition into a slab;

heating said slab to a temperature of from about 900° to about 1300° C.;

subjecting said heated slab to hot rolling conducted at a total rolling reduction of about 70% or higher and to a rolling finish temperature of about 600° C. or higher;

taking up said hot-rolled steel at a temperature of about 800° C. or lower;

subjecting said hot-rolled steel to cold rolling conducted at a rolling reduction of about 50% or higher; and subjecting said cold-rolled steel to annealing conducted at a temperature of about 600° C. or higher for a period of about 5 seconds or longer.

25. A method of producing steel having excellent workability, produced by an electric furnace-vacuum degassing process, as claimed in claim 24, wherein the composition of the steel in said electric furnace is adjusted to comprise about:

C: from 0.03 to 0.10 wt %
Cu: 0.02 to 1.5 wt %
Ni: 0.02 to 2.0 wt %
N: from 0.0040 to 0.0150 wt % said method further comprising:
effecting ladle refining of said molten steel discharged from said electric furnace, in a manner to adjust the S content in said molten steel to about S: 0.020 wt % before said molten steel is subjected to said degassing.

26. A method of producing steel having excellent workability, produced by an electric furnace-vacuum degassing process, as claimed in claim 24, wherein the step of degassing while adding alloy components performed in the vacuum-degassing furnace is conducted such that the adjusted composition comprises about Mn: 0.14 wt % or less, and wherein the approximate contents of Mn and S meet the condition of Mn/S≦7.0.

27. A method of producing steel having excellent workability, produced by an electric furnace-vacuum degassing process, as claimed in claim 24, wherein the step of degassing while adding alloy components performed in said vacuum-degassing furnace is conducted such that the adjusted composition comprises one or both of elements selected from the group consisting of Nb: from about 0.001 to 0.10 wt %; and B: from about 0.0001 to 0.010 wt %.

28. A method of producing steel having excellent workability, produced by an electric furnace-vacuum degassing process, as claimed in claim 24, wherein the temperature to which said slab is heated ranges from about 900° to about 1150° C.

29. A method of producing steel having excellent workability, produced by an electric furnace-vacuum degassing process, as claimed in claim 24, wherein the C content of said steel after said vacuum degassing is about 0.0028 wt % or less.

30. A method of producing steel having excellent workability, produced by an electric furnace-vacuum degassing process, as claimed in claim 24, wherein the Mn content of said steel after said vacuum degassing is about 0.05 wt % or less.

31. A method of producing steel having excellent workability, produced by an electric furnace-vacuum degassing process, as claimed in claim 24, wherein the ratio of molten iron to the total amount of the ferrous materials used in said electric furnace is about 80 wt % or less.

32. A method of producing steel having excellent workability, produced by an electric furnace-vacuum degassing process, as claimed in claim 24, wherein the composition of said molten iron is adjusted to comprise about C: from 1.2 to 5.0 wt % and P: 0.10 wt % or less.

33. A method of producing steel having excellent workability, produced by an electric furnace-vacuum degassing process, as claimed in claim 24, wherein said degassing step is conducted by a method selected from the group consisting of the RH method, the DH method and a combination of oxygen blowing and said DH method or RH method.

34. In a method of producing steel having excellent workability, the steps which comprise:

performing electric furnace degassing using as the main ferrous material iron scrap alone or iron scrap with addition of molten iron, the steps which comprise:
adjusting the steel composition in said electric furnace to comprise about:
C: from 0.03 to 0.10 wt %
Cu: 0.02 to 1.5 wt %
Ni: 0.02 to 2.0 wt %
N: from 0.0040 to 0.0150 wt %
discharging said molten steel from said electric furnace at a temperature not lower than about 1550° C.;

said method further comprising effecting ladle refining of said molten steel discharged from said electric furnace in a manner to adjust the S content in said molten steel to about S: 0.020 wt % before subjecting said molten steel to said degassing;

and vacuum degassing said molten steel while adding necessary alloy components to form a steel composition which comprises about:
C: 0.0050 wt % or less
Si: 1.5 wt % or less
Mn: 1.5 wt % or less
P: 0.10 wt % or less
Al: 0.10 wt % or less
S: 0.020 wt % or less
O: 0.01 wt % or less
Cu: 0.02 to 1.5 wt %
Ni: 0.02 to 2.0 wt %
Ti and/or Nb: from 0.001 to 0.10 wt % and
N: from 0.0040 to 0.0090 wt %, and recovering the steel so produced.

35. In a method of producing steel having excellent workability, the steps which comprise:

performing electric furnace degassing using as the main ferrous material iron scrap alone or iron scrap with addition of molten iron, the steps which comprise:
adjusting the steel composition in said electric furnace to comprise about:
C: from 0.03 to 0.10 wt %
Cu: 0.02 to 1.5 wt %
Ni: 0.02 to 2.0 wt %
N: from 0.0040 to 0.0150 wt %
discharging said molten steel from said electric furnace at a temperature not lower than about 1550° C.;

said method further comprising effecting ladle refining of said molten steel discharged from said electric furnace in a manner to adjust the S content in said molten steel to about S: 0.020 wt % before subjecting said molten steel to said degassing;

and vacuum degassing said molten steel while adding necessary alloy components to form a steel composition which comprises about:

C: 0.0050 wt % or less
Si: 1.5 wt % or less
Mn: 1.5 wt % or less
P: 0.10 wt % or less
Al: 0.10 wt % or less
O: 0.01 wt % or less
S: 0.020 wt % or less
N: from 0.0040 to 0.0090 wt %
Ti: from 0.014 to 0.10 wt %
Cu: 0.02 to 0.96 wt %
Ni: 0.02 to 0.88 wt %
wherein the adjusted composition also meets the conditions of about:

$$Ti/48 - (N/14 + S*/32) \geq C/12$$

where
$S* = 32(S/32 - 0.3Mn/55)$; and $0.0015 \leq Cu/64 + Ni/59 \leq 0.0150$;

continuously casting said molten steel of said adjusted composition into a slab;

heating said slab to a temperature of from about 900° to about 1300° C.;

subjecting said heated slab to hot rolling conducted at a total rolling reduction of about 70% or higher and to a rolling finish temperature of about 600° C. or higher;

taking up said hot-rolled steel at a temperature of about 800° C. or lower;

subjecting said hot-rolled steel to cold rolling conducted at a rolling reduction of about 50% or higher; and subjecting said cold-rolled steel to annealing conducted at a temperature of about 600° C. or higher for a period of about 5 seconds or longer.

* * * * *

UNITED STATES PATENT AND TRADEMARK OFFICE
CERTIFICATE OF CORRECTION

PATENT NO. : 5,853,659
DATED : December 29, 1998
INVENTOR(S) : Sekita, et al

It is certified that error appears in the above-identified patent and that said Letters Patent is hereby corrected as shown below:

In Column 21, at Table 5, at the subheading "EL", line 8, please change "49" to --40--.

In Column 25, at Table 7, at the subheading "FDT (°C.)", at line 10, please change "88Q" to --880--.

In Column 30, at Table 12-2, at the heading "Y", at line 4, please change "0.0967" to --0.0067--.

In Column 32, at Table 15-2, a the heading "O", at line 5, please change "0.001" to --0.003--.

In Column 33, at Table 16, at the subheading "SRT (°C.)", at line 8, please change "1250" to --1050--.

Signed and Sealed this

First Day of June, 1999

Attest:

Q. TODD DICKINSON

*Attesting Officer*   *Acting Commissioner of Patents and Trademarks*